(12) United States Patent
Zou et al.

(10) Patent No.: US 11,328,172 B2
(45) Date of Patent: May 10, 2022

(54) METHOD FOR FINE-GRAINED SKETCH-BASED SCENE IMAGE RETRIEVAL

(71) Applicants: Changqing Zou, Markham (CA); Wei Li, Markham (CA)

(72) Inventors: Changqing Zou, Markham (CA); Wei Li, Markham (CA)

(73) Assignee: Huawei Technologies Co. Ltd., Shenzhen (CN)

(*) Notice: Subject to any disclaimer, the term of this patent is extended or adjusted under 35 U.S.C. 154(b) by 17 days.

(21) Appl. No.: 17/001,361

(22) Filed: Aug. 24, 2020

(65) Prior Publication Data

US 2022/0058429 A1 Feb. 24, 2022

(51) Int. Cl.
*G06K 9/62* (2022.01)
*G06F 16/56* (2019.01)
(Continued)

(52) U.S. Cl.
CPC .......... *G06K 9/6215* (2013.01); *G06F 16/56* (2019.01); *G06F 16/5854* (2019.01); *G06K 9/6232* (2013.01); *G06K 9/6261* (2013.01); *G06N 3/0454* (2013.01); *G06T 7/11* (2017.01); *G06V 10/426* (2022.01); *G06V 10/443* (2022.01); *G06T 2207/20016* (2013.01); *G06T 2207/20084* (2013.01)

(58) Field of Classification Search
CPC . G06T 2207/20084; G06T 2207/20016; G06T 7/11; G06N 3/0454; G06K 9/6261; G06K 9/6232; G06K 9/469; G06K 9/4609; G06K 9/6215; G06F 16/56; G06F 16/5854
See application file for complete search history.

(56) References Cited

U.S. PATENT DOCUMENTS 7,389,208 B1* 6/2008 Solinsky ................. G06N 3/02
703/2
9,687,180 B1* 6/2017 Deninger ................ G01S 19/42
(Continued)

OTHER PUBLICATIONS

Yu et al. "Sketch me that Shoe" 2016 IEEE Conference on Computer Vision and Pattern Recognition—Jun. 27-30, 2016 (pp. 1-9).*
(Continued)

*Primary Examiner* — Mia M Thomas

(57) ABSTRACT

A sketch-based image retrieval method, device and system, to improve accuracy of image searching from a scene sketch image. For example, the image retrieval method, device and system can be used to retrieve a target scene image from a collection of stored images in a storage (i.e., an image collection). The image retrieval method includes: segmenting the scene sketch image using an image segmentation module into semantic object-level instances, and fine-grained features are obtained for each object instance, generating an attribute graph which integrates the fine-grained features for each semantic object instance detected from the query scene sketch image, generating a feature graph by using a graph encoder module from the attribute graph, and computing a similarity or distance between the feature graphs of the query scene sketch image and the scene images in the image collection by a graph matching module and the most similar scene images are returned.

25 Claims, 14 Drawing Sheets

(51) Int. Cl.
  *G06F 16/583* (2019.01)
  *G06N 3/04* (2006.01)
  *G06T 7/11* (2017.01)
  *G06V 10/426* (2022.01)
  *G06V 10/44* (2022.01)

(56) References Cited

U.S. PATENT DOCUMENTS

| | | | | |
|---|---|---|---|---|
| 10,248,664 | B1* | 4/2019 | Shen | G06N 3/0454 |
| 10,417,526 | B2* | 9/2019 | Huang | G06N 3/08 |
| 10,430,946 | B1* | 10/2019 | Zhou | G06N 3/0454 |
| 11,048,502 | B1* | 6/2021 | Hogan | G06N 3/0454 |
| 2010/0104158 | A1* | 4/2010 | Shechtman | G06K 9/46 382/131 |
| 2011/0276312 | A1* | 11/2011 | Shalon | A61B 5/6838 702/187 |
| 2013/0147911 | A1* | 6/2013 | Karsch | H04N 13/261 348/43 |
| 2017/0046839 | A1* | 2/2017 | Paik | G06K 9/6296 |
| 2017/0345181 | A1* | 11/2017 | Yu | G06T 7/194 |
| 2018/0012082 | A1* | 1/2018 | Satazoda | G06K 9/00805 |
| 2018/0232400 | A1* | 8/2018 | Saavedra Rondo | G06K 9/4671 |
| 2018/0253622 | A1* | 9/2018 | Chen | G06N 3/08 |
| 2018/0330194 | A1* | 11/2018 | Peng | G06K 9/6256 |
| 2020/0267334 | A1* | 8/2020 | Cyrus | G06T 7/194 |
| 2021/0076016 | A1* | 3/2021 | Sviridenko | H04L 65/601 |
| 2021/0133461 | A1* | 5/2021 | Ren | G06T 7/246 |
| 2021/0138655 | A1* | 5/2021 | Mousavian | G06T 7/50 |
| 2021/0150249 | A1* | 5/2021 | Zheng | G06K 9/4628 |
| 2021/0271707 | A1* | 9/2021 | Lin | G06F 16/5854 |
| 2021/0312628 | A1* | 10/2021 | Larlus-Larrondo | G06T 7/11 |

OTHER PUBLICATIONS

He et al.; Deep Residual Learning For Image Recognition 2006.
Eitz, Mathias et al.; An Evaluation of Descriptors For Large Scale etc.; Computers & Graphics 2010.
Hu, Rui et al.; A Performance Evaluation of Gradient Field HOG etc.; Computer Vision and Image Understanding Feb. 14, 2013.
Yu, Qian et al.; Sketch-a-Net: A Deep Neural Network That Beats Humans; Int J Comput Vis Jul. 26, 2016.
Aytar, Yusuf et al.; Cross-Modal Scene Networks Oct. 27, 2016.
He, Kaiming et al.; Mask R-CNN; Facebook AI Research (FAIR) Jan. 24, 2018.
Johnson, Justin et al.; Image Retrieval Using Scene Graphs 2020.
Wikipedia, Canny Edge Detector Jul. 21, 2020.
Xie, Saining et al.; Holistically-Nested Edge Detection Oct. 4, 2015.
He, Kaiming et al.; Deep Residual Learning For Image Recognition Dec. 10, 2015.
Russakovsky, Olga et al.; ImageNet Large Scale Visual Recognition Challenge; Int J Comput Vis; 115 Apr. 11, 2015.
Sangkloy, Patsorn et al.; The Sketchy Database: Learning to Retrieve Badly Drawn Bunnies 2020.
Szegedy, Christian et al.; Rethinking The Inception Architecture For Computer Vision Dec. 11, 2015.
Google Code Archive—Long-Term Storage For Google Code Project Hosting Jul. 22, 2020.
Simonyan, Karen et al.; Very Deep Convolutional Networks For Large-Scale Image Recognition; ICLR 2015 Apr. 10, 2015.
Lowe, David G.; Distinctive Image Features From Scale-Invariant Keypoints; Int. J Comp Vis Jan. 5, 2004.
Dalal, Navneet et al.; Histograms of Oriented Gradients For Human Detection; IEEE CVPR 05 2005.
Belongie, Serge et al.; Shape Matching and Object Recognition Using Shape Contexts; IEEE Transactions on Pattern Analysis and Machine Intellegence vol. 24 Apr. 2002.
Zou, C. et al.; SketchyScene: Richly-Annotated Scene Sketches Aug. 7, 2018.

* cited by examiner

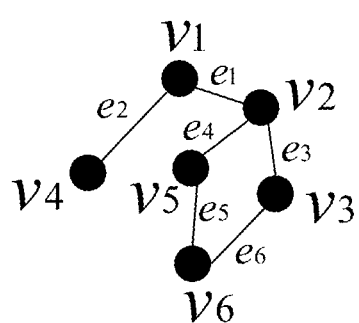
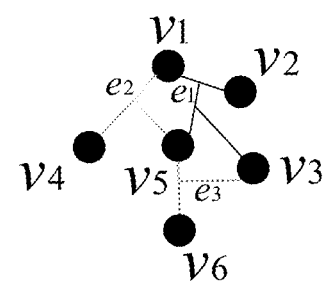
FIG. 9A   FIG. 9B

METHOD FOR FINE-GRAINED SKETCH-BASED SCENE IMAGE RETRIEVAL

TECHNICAL FIELD

Example embodiments relate to image retrieval, for example image retrieval of a target image based from a sketch of a scene.

BACKGROUND

Large unannotated image collections are difficult to explore, and retrieving a desired target image can be a difficult task. When searching for a scene image, one existing method is keyword semantic searching that searches by using the scene category name itself, resulting in general undirected results on the broad scene category. Another existing method is to search using the names of one of one or objects of the scene, which can have improved results from the scene category name, but would still be difficult to find a particular target image.

Yet another existing method of searching is to search using a sketch image, for example the user freehand draws a sketch for retrieval of a related image. Some of the existing methods are limited to image matching based on the object represented in the sketch image. Some other existing methods merely identify the scene category name from the sketch image, and generally matches with images in the image collection having the same scene category name. Such existing methods have similar limitations to the above-describe semantic searching in that only general image results may be found which can be described with the same scene category name.

It is desirable to provide sketch-based image retrieval that compares details of objects in a scene sketch image in order to retrieve a particular target scene image.

SUMMARY

Example embodiments provide a sketch-based image retrieval ("SBIR" or "image retrieval") method, device and system, to improve accuracy of image searching from a scene sketch image. For example, the image retrieval method, device and system can be used to retrieve a target scene image from a collection of stored images in a storage (i.e., an image collection).

According to a first aspect, the method processes the scene sketch image and find similar scene images in an image collection (i.e., from a collection of scene images), and in particular is configured to retrieve a target image that is the particular target scene image that is desired to be retrieved from the image collection. Specifically, the image retrieval method provided in the example embodiments can be applied to a large image collection (i.e., an image collection that includes a large number of scene images) which may or may not be categorized.

Therefore, a technical effect of the method of the present disclosure is that a scene sketch image can be used to find and retrieve a target scene image in a computational efficient and accurate manner.

In an example scenario, the image retrieval method uses a fine-grained image segmentation (or "image segmentation") method. The fine-grained image segmentation method can be performed on the scene sketch image and each of the scene images in the image collection. For example, the fine-grained image segmentation method generates, using an image segmentation module, a fine-grained instance segmentation image comprising at least one object instance detected in the scene sketch image, a fine-grained feature vector encoding one or more visual attributes for each of the at least one detected object instance, and category information, object size information, and location information for each detected object instance. The category information is the category label of the object instance, i.e. what is the object instance. The object size information is the size of the object instance within the scene sketch image, e.g. pixel size. The location information is where the object instance is located in the scene sketch image, e.g. Cartesian co-ordinates. In some examples, the object size information and the location information is represented by a bounding box, which is a rectangle identified for the scene sketch image that represents the location information and the object size information.

A technical effect of the fine-grained image segmentation method is that a scene image can be segmented and fine-grained attributes can be generated from the scene image, improving accuracy of image retrieval method.

The image segmentation module includes a first convolution neural network, a second convolution neural network, and a third convolution neural network. The fine-grained image segmentation method includes generating, using the first convolution neural network on the scene image, first features maps of at least one object category of the scene image. The fine-grained image segmentation method includes generating, using the second convolution neural network on the scene image, second feature maps of fine-grained details of the at least one object category. The fine-grained image segmentation method includes generating, using the third convolution neural network on the scene image, an instance segmentation image which includes sets of pixels that identify each object instance of the scene image. The fine-grained image segmentation method includes generating, using the first feature maps, the second feature maps, and the instance segmentation image, a fine-grained instance segmentation image which includes sets of pixels that identify the at least one detected object instance, a fine-grained feature vector encoding one or more visual attributes for each of the at least one detected object instance, and category information, object size information, and location information for each detected object instance.

A technical effect of the fine-grained image segmentation method is that the parallel second convolution neural network generates fine-grained details of the at least one object category, that may not be contained in the first feature maps of the first convolution neural network, improving accuracy of image retrieval method of the present disclosure.

In an example embodiment, the image retrieval method of the present disclosure uses a feature graph generating method. The feature graph generating method can be performed on the scene sketch image and each of the scene images in the image collection. Nodes of each feature graph each represent a detected object instance in the respective scene image and an attribute feature vector which contains attributes of that object instance. Example attributes of the respective attribute feature vector for each object instance include: i) category label, ii) size and location identification (alternatively bounding box identification), iii) visual attributes, and iv) other information. Edges of the nodes represent a weight between one of the nodes and at least one of the other nodes. The feature graph of the scene image retrieved in the image collection that has the highest similarity to the feature graph of the scene sketch image is considered to belong to the target scene image, and the target scene image is then retrieved and output as the target image by the image retrieval method of the present disclosure.

A technical effect of such an embodiment is that a scene sketch image is represented as a feature graph of the detected objects so that the scene sketch image can be compared with feature graphs other scene images using graphing techniques such as distance computing, improving accuracy of the image retrieval method of the present disclosure.

In another example embodiment, the image retrieval method includes: 1) segmenting the received scene sketch image using an image segmentation module into semantic object-level instances, and fine-grained features are obtained for each object instance, 2) generating an attribute graph which integrates the fine-grained features for each semantic object instance detected from the scene sketch image, 3) generating a feature graph by using a graph encoder module from the attribute graph, and 4) computing a similarity or distance between the feature graphs of the scene sketch image and the scene images in the image collection by a graph matching module and the most similar N scene images are returned. N is 1 in some examples.

A technical effect of such an embodiment is that attributes of objects in the scene sketch image are extracted and can be compared to attributes of objects in the scene images in the image collection, improving accuracy of the image retrieval method.

In an example embodiment, the one or more visual attributes for each object instance includes at least one of: appearance, texture, shape, or pose.

A technical effect of such an embodiment is that the additional visual attributes are extracted and can be compared to visual attributes of the scene images in the image collection to improve accuracy of the image retrieval method.

In an example embodiment, the edge of each node in the feature graph is undirected. In an example embodiment, the weight of each edge represents Euclidean distance in the feature graph.

In an example embodiment, generating the feature graph includes generating an attribute graph for the fine-grained instance segmentation image and encoding the attribute graph to generate the feature graph. A technical effect of such an embodiment is that the feature graph is encoded to optimize to improve accuracy of the image retrieval method.

In an example embodiment, the image retrieval method further includes generating the feature graph for each respective scene image in the image collection.

In an example embodiment, the generating the feature graph for each respective scene image in the image collection is pre-processed; further comprising storing the feature graph for each respective image in the image collection to memory.

In an example embodiment, the generating the feature graph for each respective image in the image collection includes pre-processing each image in the image collection using an image segmentation module to generate a respective fine-grained instance segmentation image, a respective fine-grained feature vector, and category information, object size information, and location information for the at least one detected object instance, and storing the respective fine-grained instance segmentation image, the respective fine-grained feature vector, and the category information, object size information, and location information for the at least one detected object instance of each image in the image collection to memory.

In an example embodiment, the generating the respective graph similarity includes computing a distance between at least one node of the feature graph for the fine-grained instance segmentation image and at least one node of the feature graph for at least one respective image in the image collection.

In an example embodiment, the generating the respective graph similarity includes generating a category mask of the scene sketch image and a category mask of each respective image in the image collection, and computing an intersection of the category mask of the scene sketch image and the category mask of at least one respective scene image in the image collection.

In an example embodiment, the generating the respective graph similarity includes dividing the intersection by a union of the category mask of the scene sketch image and the category mask of at least one respective scene image in the image collection.

In an example embodiment, at least one edge defines a weight between a respective one of the nodes and a plurality of the other nodes. In an example embodiment, the attribute graph is a hypergraph.

A technical effect of such a scenario is that more information is encoded in the weight of the edge, which is defined between one of the nodes and a plurality of the other nodes.

According to a second aspect, an image retrieval system is provided, where the image retrieval system includes modules configured to perform the method in the first aspect.

According to a third aspect, an execution device is provided, where the execution device includes: a memory, configured to store a program; a processor, configured to execute the program stored in the memory, and when the program stored in the memory is executed, the processor is configured to perform the method in the first aspect.

According to a fourth aspect, a computer readable medium is provided, where the computer readable medium stores program code executed by an execution device, and the program code performs the method in the first aspect when executed by at least one processor of the execution device.

According to a fifth aspect, a computer program product including instructions is provided. When the computer program product is run on a computer, the computer performs the method in the first aspect.

According to a sixth aspect, a computer chip is provided, where the computer chip includes a processor and a data interface, and the processor reads, by using the data interface, instructions stored in a memory, to perform the method in the first aspect.

Optionally, in an implementation, the computer chip may further include the memory. The memory stores the instructions, and the processor is configured to execute the instructions stored in the memory. When the instructions are executed, the processor is configured to perform the method in the first aspect.

BRIEF DESCRIPTION OF THE DRAWINGS

Reference will now be made, by way of example, to the accompanying drawings which show example embodiments, and in which:

FIG. 9A illustrates an example attribute graph, generated by the image retrieval method, in accordance with an example embodiment;

FIG. 9B illustrates another example attribute graph, which is a hypergraph, generated by the image retrieval method, in accordance with another example embodiment.

Similar reference numerals may have been used in different figures to denote similar components.

DETAILED DESCRIPTION

Figure 1:
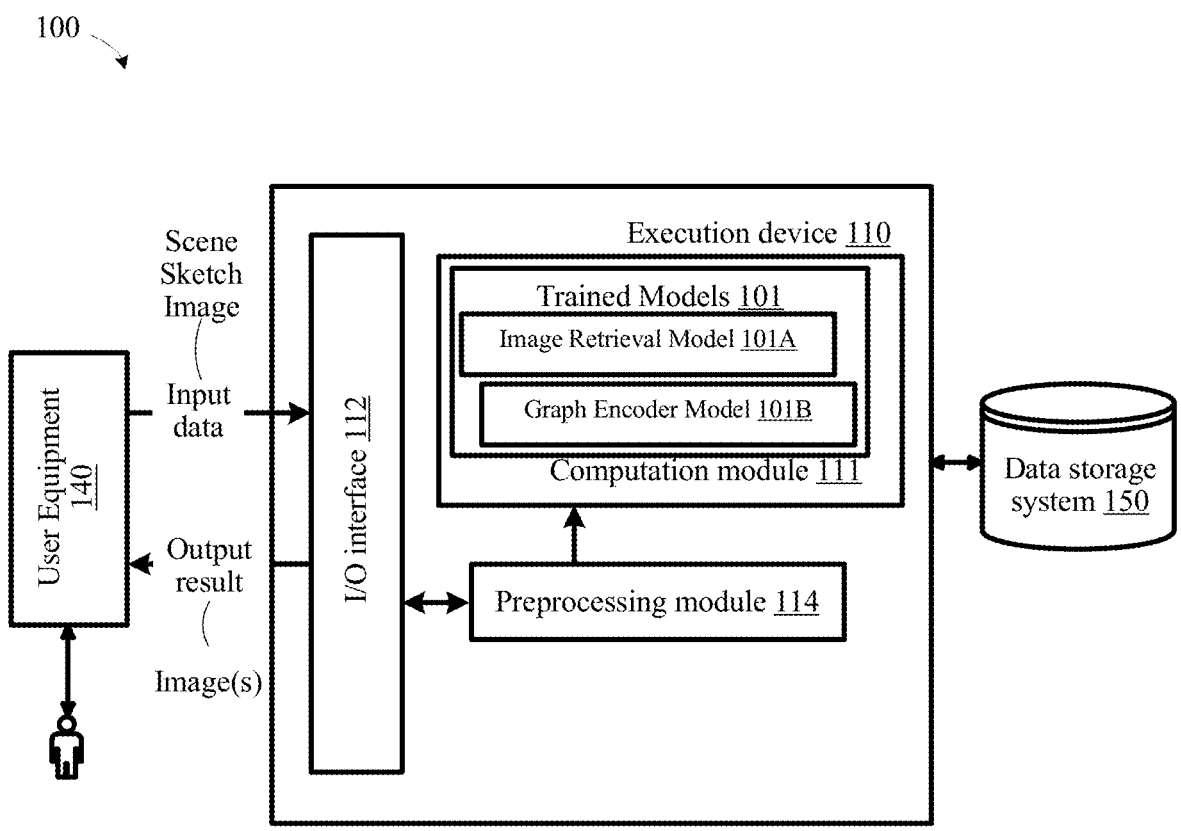
FIG. 1 is a schematic structural diagram of a system architecture of an image retrieval system according to an example embodiment.

The following describes technical solutions of example embodiments with reference to accompanying drawings.

An example embodiment is a sketch-based image retrieval ("SBIR" or "image retrieval") method which is uses fine-grained sketch based image retrieval (FG-SBIR) for retrieving scene images (i.e., those images containing multiple object instances) from a freehand scene sketch image as input. FG-SBIR allows users to not only query a target image belonging to the same category, but also with desired instance details as found in the scene sketch image and the target image.

The image retrieval method provided in example embodiments can be applied to a first example scenario in which a target scene image is desired to be retrieved. A scene sketch image is received, for example by way of drawing onto a touch screen display of a computing device. The method processes the scene sketch image and find similar scene images in an image collection stored in a storage of the computing device, and in particular is configured to retrieve a scene image that is the particular target scene image that is desired to be retrieved from the image collection. Specifically, the image retrieval method provided in the example embodiments can be applied to a large image collection which may or may not be categorized.

The image retrieval method provided in example embodiments can be applied to a second example scenario in which the target scene image is desired to be retrieved from remote storage such as a cloud server or the World Wide Web. A scene sketch image is received, for example by way of drawing onto a touch screen display of a computing device. The computing device sends the scene sketch image to the cloud server, and the cloud server performs the image retrieval method on the scene sketch image. The method processes the scene sketch image and finds similar scene images in an image collection stored in the cloud server or an image collection stored in the World Wide Web. The cloud server retrieves a scene image that is the particular target that is desired to be retrieved from the image collection.

Therefore, a technical effect is that a scene sketch image can be used to find and retrieve a target image in a computational efficient and accurate manner.

Some existing sketch-based image retrieval methods only extract a feature vector which broadly represents the scene sketch image. For example, object-level details are not considered in such methods. In contrast, example embodiments of sketch-based scene image retrieval address the problems of extracting an effective feature vector from scene images.

Example embodiments include artificial neural networks. Artificial neural networks are computational structures used to create and apply models for performing inference tasks. A neural network typically includes multiple layers of neurons, each neuron receiving inputs from a previous layer, applying a set of weights to the inputs, and combining these weighted inputs to generate an output, which is in turn provided as input to one or more neurons of a subsequent layer.

A layer of neurons uses filters to define the relationship between the outputs of the neurons of the previous layer and the outputs of the neurons of the current layer. A layer of the neural network receives a data input, usually in the form of a data array of known dimensions: in the case of neural networks operating on 2D data such as image data, the data input to a layer of the network is generally a 3D array consisting of a set of multiple 2D input activation maps (also called input feature maps or input channels). By applying the set of filters to the set of input activation maps, the layer generates a data output, which is typically a data array having known dimensions: again, in the case of neural networks operating on 2D data, the data output of a layer of the network is generally a 3D array consisting of a set of multiple 2D output activation maps (also called output feature maps or output channels).

A filter comprises a set of weights (also called parameters). In some neural networks, such as convolutional neural networks (CNNs), the weights of a filter are arranged into convolution kernels, such as 2D convolution kernels. Each kernel of a filter corresponding to a channel of the data input (i.e. an input activation map). The application of a single filter to the input volume (e.g. by convolving the kernels of the filter with the corresponding input activation maps of the data input) generates a single output activation map. The set of output activation maps generated by the set of filter of the convolution layer are the data output of the convolution layer.

Each neuron is a computational unit that uses $x_s$ and an intercept of 1 as inputs. An output from the computational unit may be:

$$h_{W,b}(x)=f(W^T x)=f(\Sigma_{s=1}^{n} W_s x_s + b) \quad (1)$$

s=1, 2, . . . n, n is a natural number greater than 1, $W_s$ is a weight of $x_s$, b is an offset (i.e. bias) of the neuron and f is an activation function (activation functions) of the neuron and used to introduce a nonlinear feature to the neural network, to convert an input of the neuron to an output. The output of the activation function may be used as an input to a neuron of a following convolutional layer in the neural network. The activation function may be a sigmoid function. The neural network is formed by joining a plurality of the foregoing single neurons. In other words, an output from one neuron may be an input to another neuron. An input of each neuron may be associated with a local receiving area of a previous layer, to extract a feature of the local receiving area. The local receiving area may be an area consisting of several neurons.

A deep neural network (Deep Neural Network, DNN) is also referred to as a multi-layer neural network and may be understood as a neural network that includes a first layer (generally referred to as an input layer), a plurality of hidden layers, and a final layer (generally referred to as an output layer). The "plurality" herein does not have a special metric. A layer is considered to be a fully connected layer when there is a full connection between two adjacent layers of the neural network. To be specific, all neurons at an $i^{th}$ layer is connected to any neuron at an $(i+1)^{th}$ layer. Although the DNN seems extremely complex, processing at each layer is actually not complex. Briefly, the operation at each layer is indicated by the following linear relational expression $\vec{y}=a(W\vec{x}+b)$, where x is an input vector, $\vec{y}$ is an output vector, $\vec{b}$ is an offset vector, w is a weight matrix (also referred to as a coefficient), and a( ) is an activation function. At each layer, only such a simple operation is performed on an input vector $\vec{x}$, to obtain an output vector Because there is a large quantity of layers in the DNN, there is also a large quantity of coefficients w and offset vectors $\vec{b}$. Definitions of these parameters in the DNN are as follows: The coefficient w is used as an example. It is assumed that in a three-layer DNN (i.e. a DNN with three hidden layers), a linear coefficient from a fourth neuron at a second layer to a second neuron at a third layer is defined as $w_{24}^{3}$. The superscript 3 represents a layer of the coefficient w, and the subscript is corresponding to the output layer-3 index 2 and the input layer-2 index 4. In conclusion, a coefficient from a $k^{th}$ neuron at an $(L-1)^{th}$ layer to a $j^{th}$ neuron at an $L^{th}$ layer is defined as $W_{jk}^{L}$. It should be noted that there is no W parameter at the input layer. In the DNN, more hidden layers enable the DNN to depict a complex situation in the real world. In theory, a DNN with more parameters is more complex, has a larger "capacity", and indicates that the DNN can complete a more complex learning task. Training of the deep neural network is a weight matrix learning process. A final purpose of the training is to obtain a trained weight matrix (a weight matrix consisting of learned weights W of a plurality of layers) of all layers of the deep neural network.

A convolutional neural network (CNN, Convolutional Neural Network) is a deep neural network with a convolutional structure. The convolutional neural network includes a feature extractor consisting of a convolutional layer and a sub-sampling layer. The feature extractor may be considered as a filter. A convolution process may be considered as performing convolution on an image or a convolutional feature map (feature map) by using a trainable filter. The convolutional layer indicates a layer of neurons at which convolution processing is performed on an input in the convolutional neural network. At the convolutional layer of the convolutional neural network, one neuron may be connected only to neurons at some neighboring layers. One convolutional layer usually includes several feature maps, and each feature map may be formed by some neurons arranged in a rectangle. Neurons at a same feature map share a weight. The shared weight herein is the convolutional kernel. The shared weight may be understood as being unrelated to a manner and a position of image information extraction. A hidden principle is that statistical information of a part of an image is the same as that of another part. This indicates that image information learned in a part may also be used in another part. A plurality of convolutional kernels may be used at a same convolutional layer to extract different image information. Generally, a larger quantity of convolutional kernels indicates that richer image information is reflected by a convolution operation.

A convolutional kernel may be initialized in a form of a matrix of a random size. In a training process of the convolutional neural network, a proper weight may be obtained by performing learning on the convolutional kernel. In addition, a direct advantage brought by the shared weight is that a connection between layers of the convolutional neural network is reduced and a risk of overfitting is lowered.

A pixel value of an image may be a red, green, and blue (RGB) color value. The pixel value may be a long integer indicating a color. For example, a pixel value is 255*Red+ 100*Green+76Blue, where Blue represents a component of a blue color, Green represents a component of a green color, and Red represents a component of a red color. In all the color components, a smaller value indicates lower brightness, and a larger value indicates higher brightness. For a greyscale image, the pixel value may be a greyscale value (e.g., 0 to 255). For a black and white image, the pixel value may be a binary value such as 0 and 1, or 0 and 255.

Example embodiments that relate to images can be similarly applied to video. For example, a video can be considered a sequence of images (generally referred to as video frames). An image retrieval method in accordance with an example embodiment can be used to retrieve a particular target video frame, or the entire video from a video collection (i.e. a collection of stored videos in a storage).

FIG. 1 illustrates a system architecture of an image retrieval system 100 in accordance with an example embodiment. A computer module 111 includes trained models 101, which can be used to implement aspects of the image retrieval method 300 (FIG. 4) according to an example embodiment. The input to the trained models 101 can be a scene sketch image or a scene image in an image collection. A scene sketch image is a sketch of a scene that is stored in image format and received from the user equipment 140. The image collection can be found in an image repository which stores image files of images, typically photographs of objects and scenes, such as data storage system 150. The trained models 101 can include target/model rules. As shown in FIG. 1, the trained model 101 can include a trained segmentation model 101A which includes a convolution neural network configured to generate a segmentation image of the scene sketch image or a scene image in the image collection, which includes object instances from the image, in which each monochromatic color represents one object instance. For example, the trained segmentation model 101A can be used to generate, for each object instance identified in the scene image, one or more attributes including: i) category label, ii) size and location identification (alternatively bounding box identification), iii) visual attributes, and iv) other information. The trained segmentation model 101A can generate a fine-grained feature vector of the visual attributes for each of the object instances. The term fine-grained feature vector is used because fine-grained attributes such as the visual attributes are contained, and which can be used for comparison purposes. The computation module 111 is configured to generate an attribute graph which integrates the fine-grained features for each semantic object instance detected from the scene sketch image. As shown in FIG. 1, the trained model 101 can include a graph encoder model 101B which includes a graph neural network (GNN) configured to generate a feature graph that encodes attributes of the scene sketch image or a scene image in the image collection. The graph encoder model 101B can generate the feature graph from the attribute graph. The feature graph of the scene sketch image can be compared to a respective feature graph of each scene image in the image collection, and the target scene image(s) that have the highest graph similarity are retrieved by the image retrieval method 300.

In FIG. 1, the execution device 110 includes an I/O interface 112, which is configured to perform data interaction with a user equipment 140. A user may input data to the user equipment 140 which is then communicated to the I/O interface 112 using wired or wireless communication. In another example, the execution device 110 is part of the user equipment, and the user may input data over the I/O interface 112 to the execution device 110. In an example embodiment, the input data may include: a scene sketch image generated by the user equipment 140 from a sketch of a scene drawn by the user of the user equipment 140. In an example embodiment, the input data may also include an identification in an image collection to which candidate scene images are located for retrieval. In an example, the candidate scene images are photographs (or videos which can include a sequence of individual photographs, called video frames). The image collection can be found in an image repository that includes one or more memories or one or more devices which store or can access candidate images for retrieval. In example embodiments, the image collection can be found in the execution device 110 itself, the user equipment 140 itself, a different user equipment device, a cloud server, an Internet Protocol (IP) address, an externally accessed user account, an externally accessed social media account, or images from the World Wide Web, etc. The image collection can be a subset of available images in the image collection, such as only scene images.

A preprocessing module 114 is configured to perform preprocessing based on the input data (for example, the scene sketch image) received from the user equipment 140 via the I/O interface 112. In this embodiment, the preprocessing module 114 may be configured to convert a scene sketch image to a grayscale image or a binary image. In some examples, preprocessing is not performed when a scene sketch image is in color, and three input channels (maps) of red, green, blue are the input data which is processed by the computation module 111. In some example, the input data is already in grayscale or binary, and preprocessing is not performed.

In a related processing process in which the preprocessing module 114 performs preprocessing on the input data or the computation module 111 in the execution device 110 performs computation, the execution device 110 may invoke data, code, or the like from a data storage system 150, to perform corresponding processing, or may store, in a data storage system 150, data, an instruction, or the like obtained through corresponding processing.

The computation module 111 returns a processing result, for example, the image file containing a scene image that is most similar to the input scene sketch image, and the execution device 110 provides the processing result to the user equipment 140 via the I/O interface 112. The image file contains the target desired scene image that the user is seeking by way of the input scene sketch image. The processing result can be the image file itself (e.g., in native or compressed file format), or an identifier or an address of where to retrieve the image file containing the scene image. The processing result can be a plurality of candidate image files and their prediction error (e.g., by way of degree or rank of similarity to the scene sketch image).

In the embodiment shown in FIG. 1, the user may perform a draw operation on an input device of the user equipment 140, such as a touchpad, or a touchscreen display to sketch a scene based image. Alternatively, a user may perform a draw operation using an input device, such as a mouse, of the user equipment 140 to sketch a scene based image. In each of these embodiments, the user equipment 140 then generates an image file that contains a scene sketch image that corresponds to the sketched scene based image (i.e. the sketch of a scene drawn by a user of user equipment). Still alternatively, the user may perform draw operation using a mid-air gesture to sketch a scene based image. In this embodiment a camera of the user equipment 149 captures a video that contains the mid-air gesture and processes the video to obtain a scene sketch image that corresponds to the scene based image sketched by the user. The user equipment 140 then transmits an image file that contains the scene sketch image to the execution device 110 via the I/O interface 112. In another case, the user equipment 140 may transmit to execution device 110 via the I/O interface 112 an identification of the image file that contains the scene sketch image and causing the image file containing scene sketch image to be retrieved by the execution device 110 via I/O interface 112 (e.g. the user equipment 140 sending an identifier or an address of where to retrieve the image file of the scene sketch image).

It should be noted that FIG. 1 is merely a schematic diagram of a system architecture of the image retrieval system 100 according to an example embodiment. Position relationships between the execution device 110, the user equipment 140, the computation module 111, the preprocessing module 114, and the like that are shown in FIG. 1 do not constitute any limitation. For example, the data storage system 150 is an external memory relative to the execution device 110. In another example, the data storage system 150 may be part of (i.e. located in) the execution device 110.

As shown in FIG. 1, in some examples, parts of the trained segmentation model 101A may be obtained through libraries, such as category label libraries that provide category labels of particular scene images or images of particular object instances.

Figure 2:
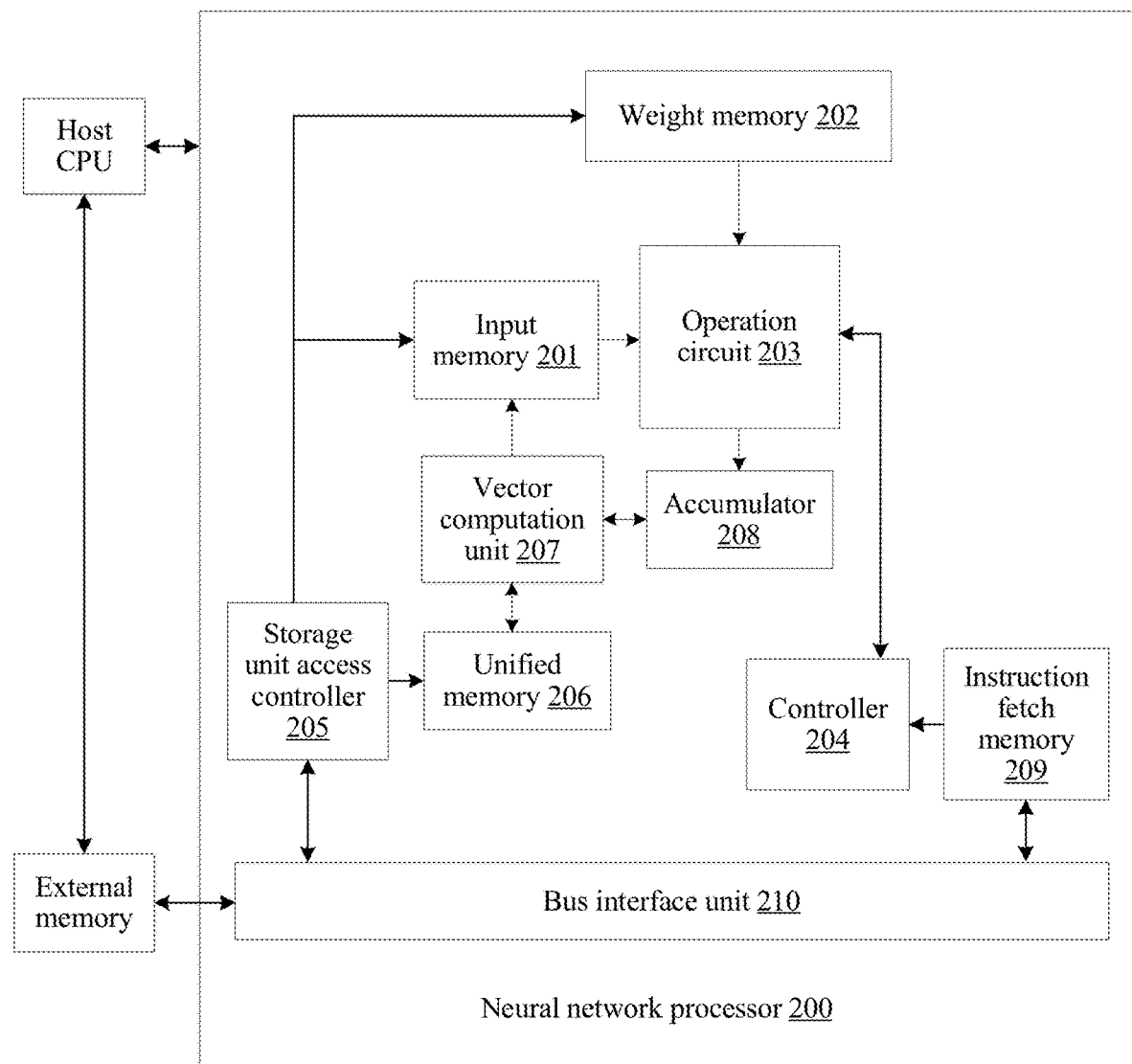
FIG. 2 is a schematic diagram of a hardware structure of a chip according to an example embodiment.

FIG. 2 shows a block diagram of a computer chip implemented in the execution device according to an example embodiment. The computer chip includes a neural network processor 200. The computer chip may be provided in the execution device 110 shown in FIG. 1, to perform computations of the image retrieval system 100.

The neural network processor 200 may be any processor that is applicable to massive exclusive OR operations, for example, a Neutral Processing Unit (NPU), a tensor processing unit (TPU), a graphics processing unit (GPU), or the like. The NPU is used as an example. The NPU may be mounted, as a coprocessor, to a host CPU (Host CPU), and the host CPU allocates a task to the NPU. A core part of the NPU is an operation circuit 203. A controller 204 controls the operation circuit 203 to extract matrix data from memories (201 and 202) and perform multiplication and addition operations.

In some implementations, the operation circuit 203 internally includes a plurality of processing units (Process Engine, PE). In some implementations, the operation circuit 203 is a bi-dimensional systolic array. In addition, the operation circuit 203 may be a uni-dimensional systolic array or another electronic circuit that can implement a mathematical operation such as multiplication and addition. In some implementations, the operation circuit 203 is a general matrix processor.

For example, it is assumed that there are an input matrix A, a weight matrix B, and an output matrix C. The operation circuit 203 obtains, from a weight memory 202, weight data of the matrix B, and caches the data in each PE in the operation circuit 203. The operation circuit 203 obtains input data of the matrix A from an input memory 201, and performs a matrix operation based on the input data of the matrix A and the weight data of the matrix B. An obtained partial or final matrix result is stored in an accumulator (accumulator) 208.

A unified memory 206 is configured to store input data and output data. Weight data is directly moved to the weight memory 202 by using a storage unit access controller 205 (Direct Memory Access Controller, DMAC). The input data is also moved to the unified memory 206 by using the DMAC.

A bus interface unit (BIU, Bus Interface Unit) 210 is used for interaction between the DMAC and an instruction fetch memory (Instruction Fetch Buffer) 209. The bus interface unit 210 is further configured to enable the instruction fetch memory 209 to obtain an instruction from an external memory, and is further configured to enable the storage unit access controller 205 to obtain, from the external memory, source data of the input matrix A or the weight matrix B.

The DMAC is mainly configured to move input data from an external memory DDR to the unified memory 206, or move the weight data to the weight memory 202, or move the input data to the input memory 201.

A vector computation unit 207 includes a plurality of operation processing units. If needed, the vector computation unit 207 performs further processing, for example, vector multiplication, vector addition, an exponent operation, a logarithm operation, or magnitude comparison, on an output from the operation circuit 203. The vector computation unit 207 is mainly used for computation at a non-convolutional layer or fully-connected layers (FC, fully connected layers) of a neural network, and specifically, may perform processing on computation such as pooling (pooling) or normalization (normalization). For example, the vector computation unit 207 may apply a nonlinear function to an output of the operation circuit 203, for example, a vector of an accumulated value, to generate an activation value. In some implementations, the vector computation unit 207 generates a normalized value, a combined value, or both a normalized value and a combined value.

In some implementations, the vector computation unit 207 stores a processed vector to the unified memory 206. In some implementations, the vector processed by the vector computation unit 207 may be used as activation input to the operation circuit 203, for example, to be used in a following layer of the neural network.

The instruction fetch memory (instruction fetch buffer) 209 connected to the controller 204 is configured to store an instruction used by the controller 204.

The unified memory 206, the input memory 201, the weight memory 202, and the instruction fetch memory 209 are all on-chip memories. The external memory is independent from the hardware architecture of the NPU.

Figure 3:
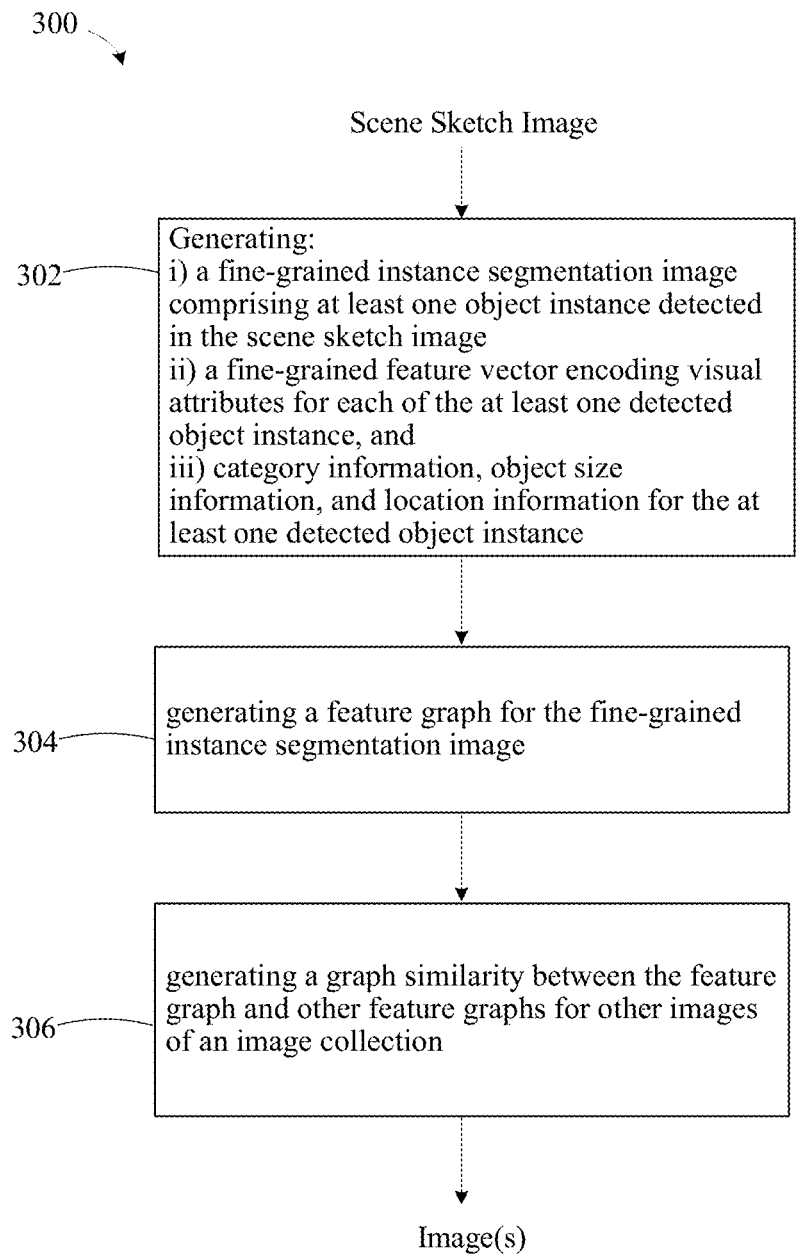
FIG. 3 is an example image retrieval method performed by an image retrieval system according to an example embodiment.

FIG. 3 is an example image retrieval method 300 performed on a scene sketch image by the execution device 110 of the image retrieval system 100, according to an example embodiment. At step 302, the execution device 110 generates, using a sketch segmentation model, a fine-grained instance segmentation image comprising at least one object instance detected in the scene sketch image, a fine-grained feature vector encoding visual attributes for each of the at least one detected object instance, and category information, object size information, and location information for the at least one detected object instance. At step 304, the execution device 110 generates a feature graph for the fine-grained instance segmentation image comprising nodes and edges, each node in the feature graph corresponding to one of the at least one object instances in the fine-grained instance segmentation image and an attribute feature vector of the corresponding object instance representing one or more attributes for each of the at least one detected object instance, each edge defining a weight between one of the nodes and at least one of the other nodes. At step 306, the execution device 110 generates a respective graph similarity between the feature graph for the fine-grained instance segmentation image and a feature graph for each respective image in an image collection. In an example, the execution device 110 outputs the image in the image collection having highest graph similarity to the scene sketch image.

Figure 4:
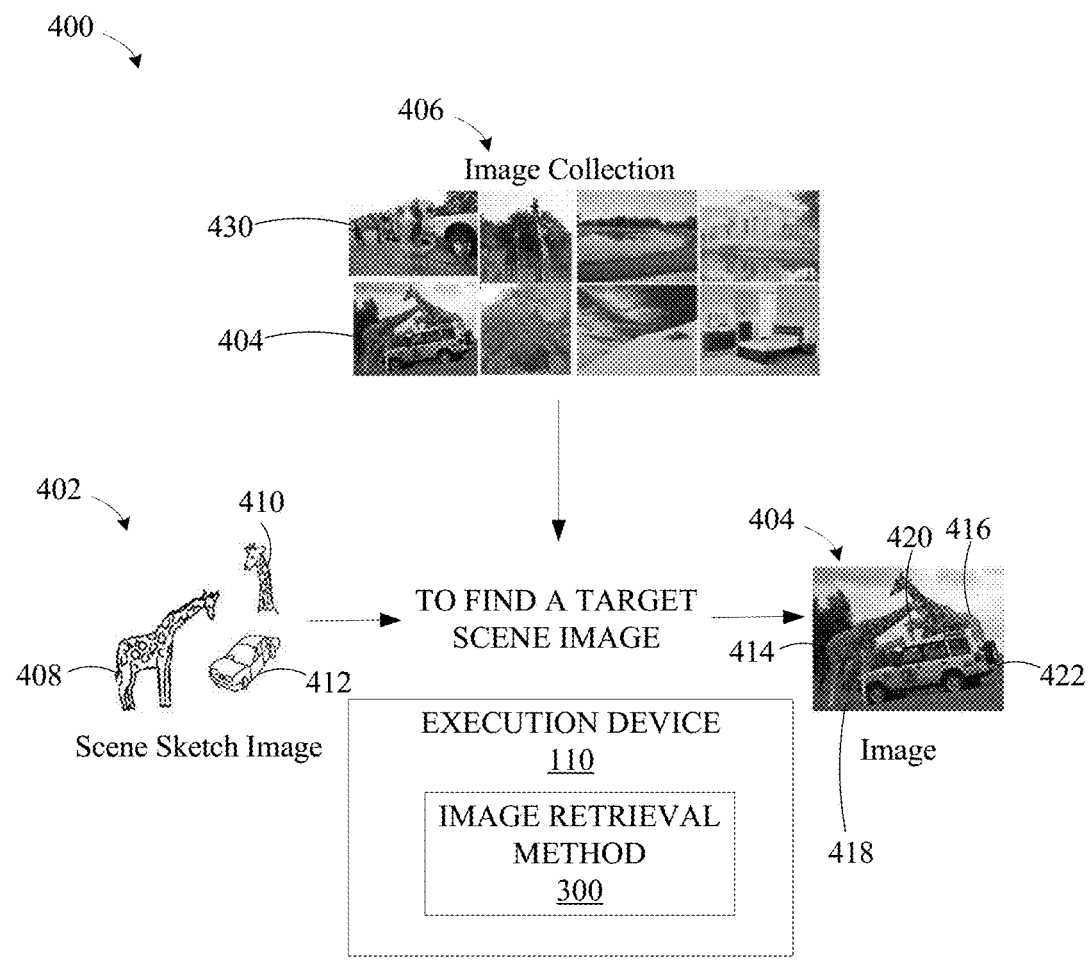
FIG. 4 is a pictorial representation of an image retrieval system in accordance with an example embodiment.

FIG. 4 illustrates an example of the sketch-based image retrieval system 400 which is configured to perform the image retrieval method 300, according to an example embodiment. The method 300 may be specifically performed by the trained segmentation model 101A and the graph encoder model 101B of the execution device 110 shown in FIG. 1. The execution device 110 executes the method 300. An image retrieval query is initiated by way of receiving the scene sketch image 402. An image file containing the scene sketch image 402 in the method 300 may be the input data provided by the user equipment 140 shown in FIG. 1. The preprocessing module 114 in the execution device 110 may be configured to perform pre-preprocessing on the scene sketch image 402, for example converting the scene sketch image 402 to generate a grayscale scene sketch image or a binary scene sketch image. The execution device 110 may be configured to process the scene sketch image 402 and find similar scene images in an image collection 406, and in particular to retrieve and output a target image 404 that is the particular target that is desired to be retrieved from the image collection. In some examples, an image file of the target image 404 is output. In some other examples, only the identification of the target image 404 is output, and the target image 404 is subsequently retrieved by the user equipment 140 (FIG. 1) from the image collection 406. In some examples, the output of the sketch-based image retrieval method 300 is more than one candidate image in the image collection having the highest similarity to the scene sketch image. The output can also include a similarity score of those candidate images. The image collection 406 can include scene images that are not similar to the input scene sketch image 402, such as image 430. The image collection 406 can include both scene images and non-scene images.

The scene sketch image 402 includes, as objects that may be identified, first giraffe 408, second giraffe 410, and a car 412. The target image 404 includes, as objects that can be identified, first giraffe 414, second giraffe 416, third giraffe 418, fourth giraffe 420, and a car 422. In the present example, the target image 404 is the most similar image to the scene sketch image based on the identified objects and other factors such as the location, size, and visual attributes of the identified objects.

Optionally, the image retrieval method 300 may be processed by a CPU, or may be jointly processed by a CPU and a GPU, or may not be processed by a GPU, but processed by another processor that is applicable to neural network computation.

Figure 5A:
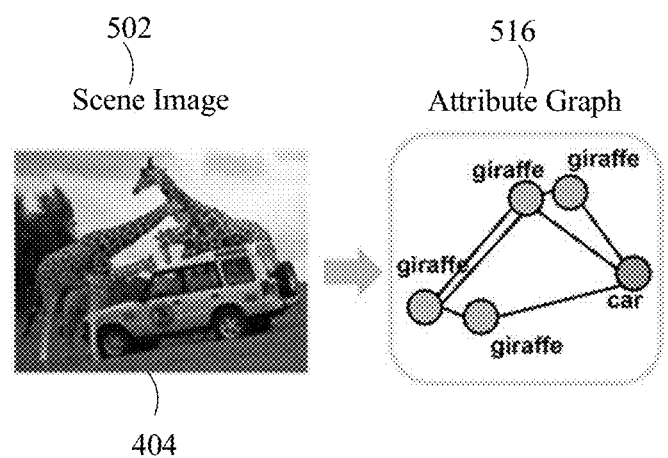
FIG. 5A is a pictorial diagram of an attribute graph generating method from a scene image in accordance with an example embodiment.

FIG. 5A is a pictorial diagram of an attribute graph 516 that is generated from, and therefore used to represent, a scene image 502. As shown in FIG. 5A, the scene image 502 is the target scene image 404. A respective attribute graph can also be generated for all scene images in the image collection 406 (not shown here). A respective attribute graph can also be generated for the scene sketch image 402 (not shown here).

As shown in FIG. 5A, the scene image 502, which is the target scene image 404 in this example, includes first giraffe, second giraffe, third giraffe, fourth giraffe, and car. The attribute graph 516 includes nodes that represent the first giraffe, the second giraffe, the third giraffe, the fourth giraffe, and the car. Each node also includes a respective attribute feature vector which includes the visual attributes of the respective object instance. The attribute graph 516 also includes edges between the nodes, which are weights. In an example, the weights represent the Euclidean distance between the nodes. In example embodiments of the image retrieval method 300, the respective attribute graphs can be compared to find the most similar image in the image collection 406 to the scene sketch image 402. The attribute feature vector can include one or more of the following attributes: i) the object category; ii) the size and location of the object instance (alternatively a bounding box represented by a rectangle on the image); iii) visual attributes such as appearance, texture, shape, and pose; and iv) other information.

Figure 5B:
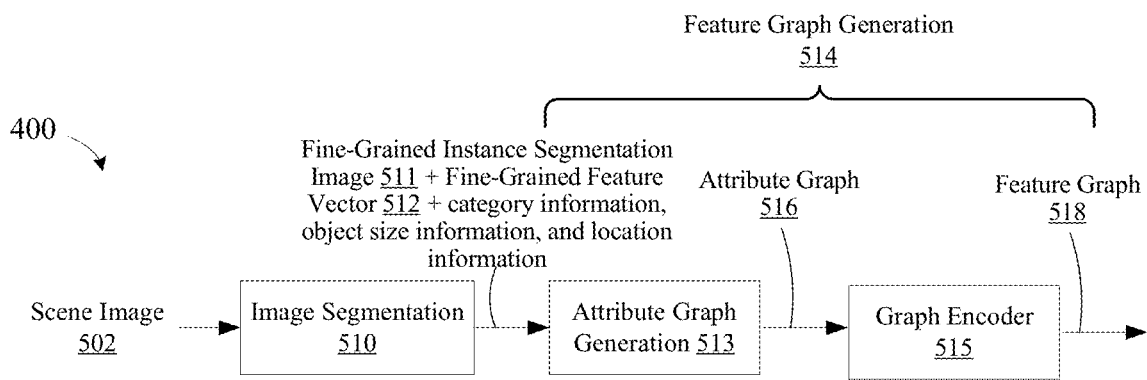
FIG. 5B is detail flow diagram of a feature graph generating method in accordance with an example embodiment.

FIG. 5B is detail flow diagram of part of the image retrieval system 400, and illustrates the generation of a feature graph 518 from, a scene image 502. The feature graph 518 is a representation of the scene image 502. The scene image 502 can be, referring briefly to FIG. 4: the target scene image 404, any or each scene image in the image collection 406, or the scene sketch image 402 (FIG. 4). The image segmentation module 510 executes the image segmentation model 101A (FIG. 1). The image segmentation module 510 of the image retrieval system 400 generates, from the scene image 502, for each object detected in the scene image 502, a fine-grained instance segmentation image 511, a fine-grained feature vector 512, and category information, object size information, and location information for each detected object instance. In an example, each scene image in the image collection 406 is pre-processed offline (i.e., prior to the image retrieval query) into a respective feature graph 518, and stored to memory. In another example, each scene image in the image collection 406 is processed to generate a respective feature graph 518 on-the-fly in real-time in response to a particular image retrieval query made from a scene sketch image 502.

An attribute graph generation module 513 of the image retrieval system 400 generates the attribute graph 516 from the fine-grained instance segmentation image 511, the fine-grained feature vector 512, and category information, object size information, and location information for each detected object instance. As described above in relation to FIG. 5A, the attribute graph 516 includes nodes (which each include an attribute feature vector for each detected object instance) and edges between the nodes. A graph encoder module 515 of the image retrieval system 400 generates the feature graph 518 from the attribute graph 516. The graph encoder module 515 is configured to optimize the respective weights of the edges of the attribute graph 516. In some examples, the graph encoder module 515 is optional and the feature graph 518 is the same as the attribute graph 516.

A feature graph generation module 514 of the image retrieval system 400 includes both the attribute graph generation module 513 and the graph encoder module 515.

In FIG. 5B, the offline process (pre-processing) of the scene images in the image collection can include the following: 1) segmenting each scene image 502 in the image collection 406 into semantic object-level instances using the image segmentation module 510 (in this step, the visual features of each object instance can be obtained and stored in the data storage system 150 as a fine-grained instance segmentation image 511, a fine-grained feature vector 512, and category information, object size information, and location information for each detected object instance); 2) generating an attribute graph 516 from the fine-grained instance segmentation image 511, the fine-grained feature vector 512, and category information, object size information, and location information for each detected object instance, using the attribute graph generation module 513 for the semantic object instances from each scene image 630; 3) generating a feature graph 518 from the attribute graph 516 by using the graph encoder module 515.

In some examples, the fine-grained instance segmentation image 511, the fine-grained feature vector 512, and the category information, object size information, and location information for each detected object instance is stored in the data storage system 150 for subsequent use by the method 300. In some examples, the feature graph 518 generated from each scene image 502 in the image collection 406 is stored in the data storage system 150 for subsequent use by the method 300.

Figure 6A:
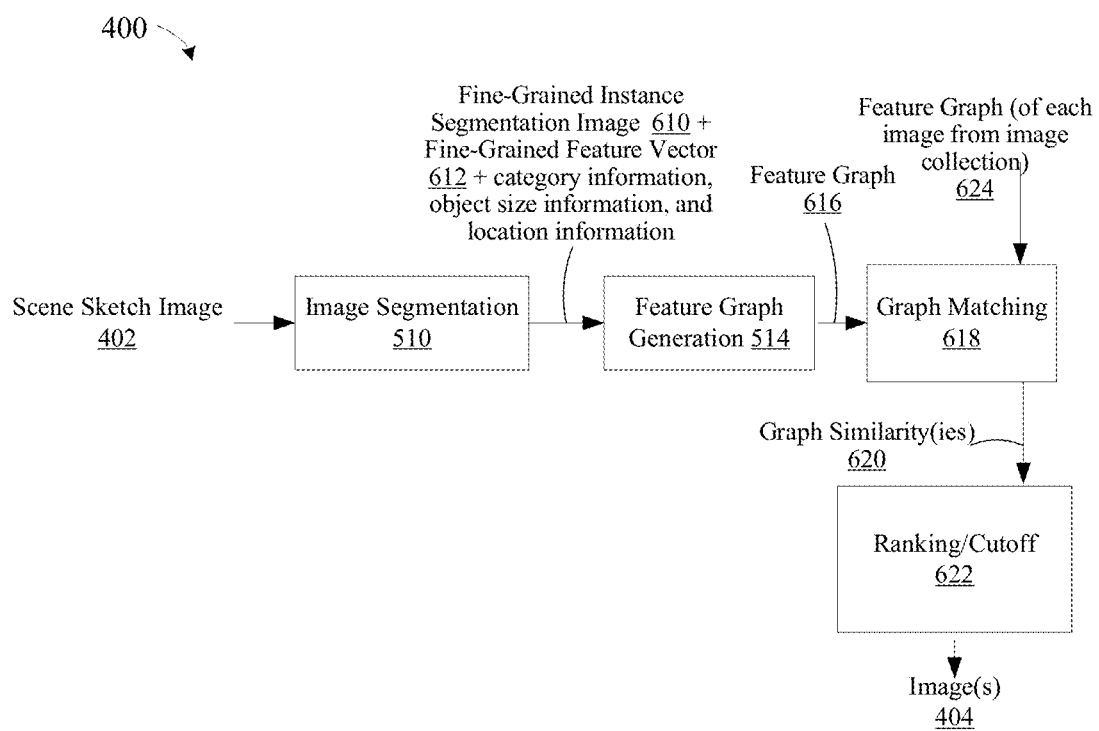
FIG. 6A is a detail flow diagram of the image retrieval method performed by the image retrieval system of FIG. 4.

FIG. 6A is a detail flow diagram of an image retrieval method 300 performed by the image retrieval system 400, in accordance with an example embodiment. Having described in FIG. 5B that a feature graph can be generated from any scene image 502, FIG. 6A illustrates generation of feature graph 616 from the scene sketch image 402 that is the input to the image retrieval system 400. The feature graph 616 can then be compared with the respective feature graph 624 of each of the images in the image collection 406, in order to retrieve and output the target image 404.

Similar to FIG. 5B, in FIG. 6A the image segmentation module 510 generates, from the scene sketch image 402, for each object detected in the scene sketch image 402, a fine-grained instance segmentation image 610, a fine-grained feature vector 612, and category information, object size information, and location information for each detected object instance.

The feature graph generation module 514 generates a feature graph 616 from the fine-grained instance segmentation image 610, the fine-grained feature vector 612, and category information, object size information, and location information for each detected object instance. The feature graph 616 includes nodes (which each include an attribute feature vector) and edges, as described above.

Each of the images in the image collection 406 are also represented by a respective feature graph 624. The feature graph 616 of the scene sketch image 402 can be compared with the other feature graphs 624 to find the most similar scene image. The graph matching module 618 performs graph matching between the feature graph 616 of the scene sketch image 402 and each of the other feature graphs 624 of the scene images in the image collection 406, and outputs the respective graph similarity 620 for all of the scene images in the image collection 406. A ranking/cutoff module 622 ranks the graph similarities from the graph matching module 618 and cuts off scene images that are dissimilar. For example, the ranking/cutoff module 622 outputs a specified number of scene images that have the highest similarity to the feature graph 616 of the scene sketch image 402. In an example, as shown in FIG. 6A, the ranking/cutoff module 622 outputs one scene image 404, which is the one scene image that has the highest graph similarity 620 to the feature graph 616 of the scene sketch image 402 (i.e. highest graph similarity score). In another example, the ranking/cutoff module 622 outputs all of the scene images 404 that have a graph similarity 620 to the feature graph 616 of the scene sketch image 402 above a certain threshold (i.e. a score above a certain threshold).

Figure 6B:
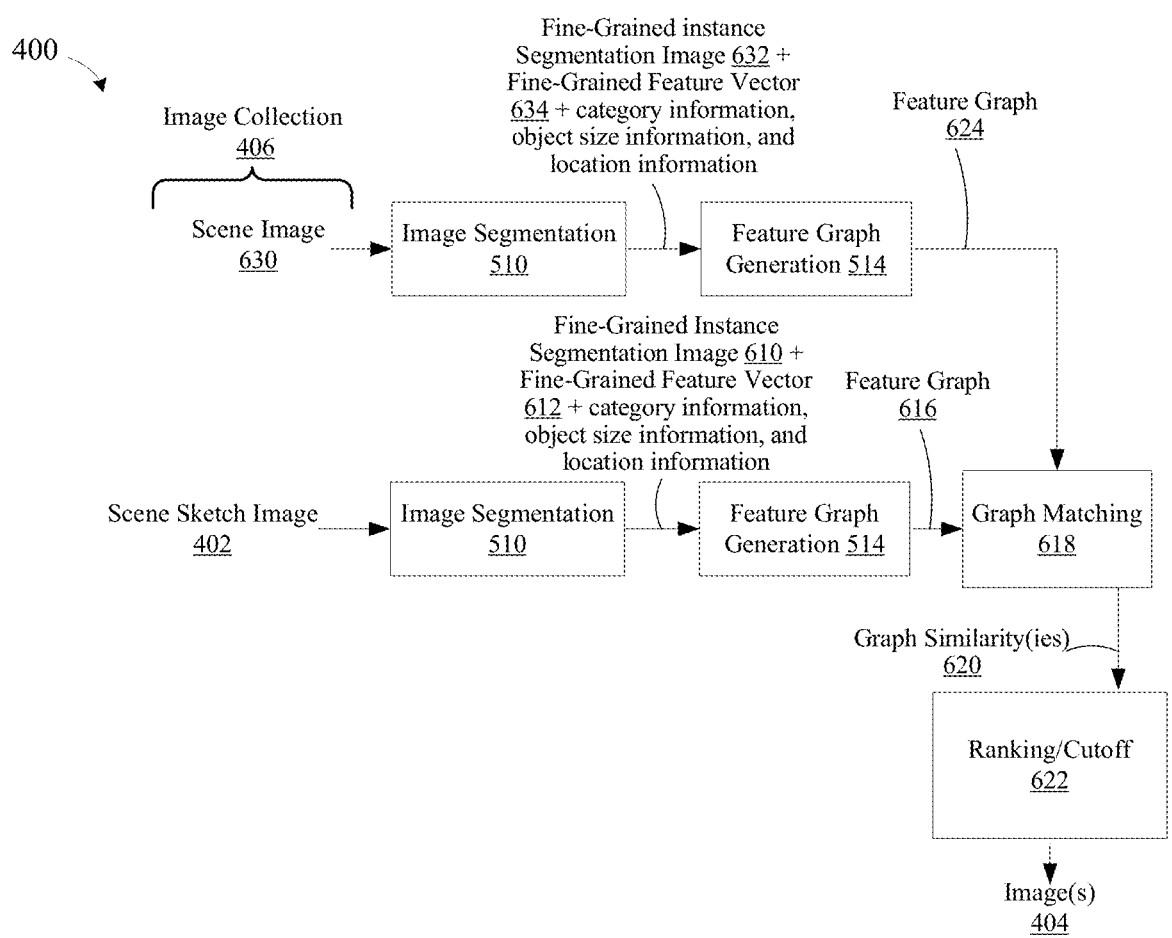
FIG. 6B is another detail flow diagram of the image retrieval method performed by the image retrieval system of FIG. 4.

FIG. 6B is another detail flow diagram of the image retrieval system 400. FIG. 6B differs from FIG. 6A in that FIG. 6B illustrates further details on the generation of the feature graphs 624 of the scene images in the image collection 406. By way of example only, the processing of one scene image 630 as input to the image retrieval system 400 will be described in greater detail, with the understanding that the same processing can be performed on the remaining scene images in the image collection 406.

The image segmentation module 510 generates, from the scene image 630, for each object detected in the scene image 630, a fine-grained instance segmentation image 632, a fine-grained feature vector 634, and category information, object size information, and location information for each detected object instance. The feature graph generation module 514 generates a feature graph 624 from the fine-grained instance segmentation image 632, the fine-grained feature vector 634 of the scene image 630, and category information, object size information, and location information for each detected object instance. The feature graph 624 includes nodes (which each include a respective attribute feature vector for the respective object instance) and edges between the nodes, as described above in relation to FIG. 5B.

In some examples, the generation of the feature graph 624 from the scene image 630 is pre-processed offline into the feature graph 624 (i.e., prior to the image retrieval query). The feature graph 624 from each scene image 630 is then stored to the data storage system 150 for retrieval when receiving the image retrieval query. In another example, the scene image 630 is processed to generate the feature graph 624 on-the-fly in real-time in response to a particular image retrieval query made from the scene sketch image 402.

Continuing the example for the single scene image 630, the graph matching module 618 performs graph matching between the feature graph 616 of the scene sketch image 402 and the feature graph 624 of the scene image 630. The ranking/cutoff module 622 ranks the graph similarities from the graph matching module 618 and cuts off scene images that are dissimilar to the feature graph 616 of the scene sketch image 402. In an example, the ranking/cutoff module 622 outputs one scene image 404, which is the target scene image 630 having the highest graph similarity 620 to the feature graph 616 of the scene sketch image 402.

Having described the feature graph 624 for a single scene image 630 in the image collection 406, the image retrieval system 400 is configured to process the remaining scene images in the image collection 406 in a similar manner. The remaining scene images in the image collection 406 can be represented by generating a respective feature graph 624 in a similar manner, resulting in a plurality of feature graphs 624, each representing a scene image that are input to the graph matching module 618. More than one scene image 404 can be output from the ranking/cutoff module 622 in some examples. In some examples, the graph similarity 620 or a related probability score for each image 404 can also optionally be output from the ranking/cutoff module 622. In example embodiments, the feature graph 624 having a dissimilar graph similarity 620 to the feature graph 616 of the scene sketch image 402 will be ranked and cut off by the ranking/cutoff 622, e.g. the graph similarity 620 is below a certain threshold.

Figure 7A:
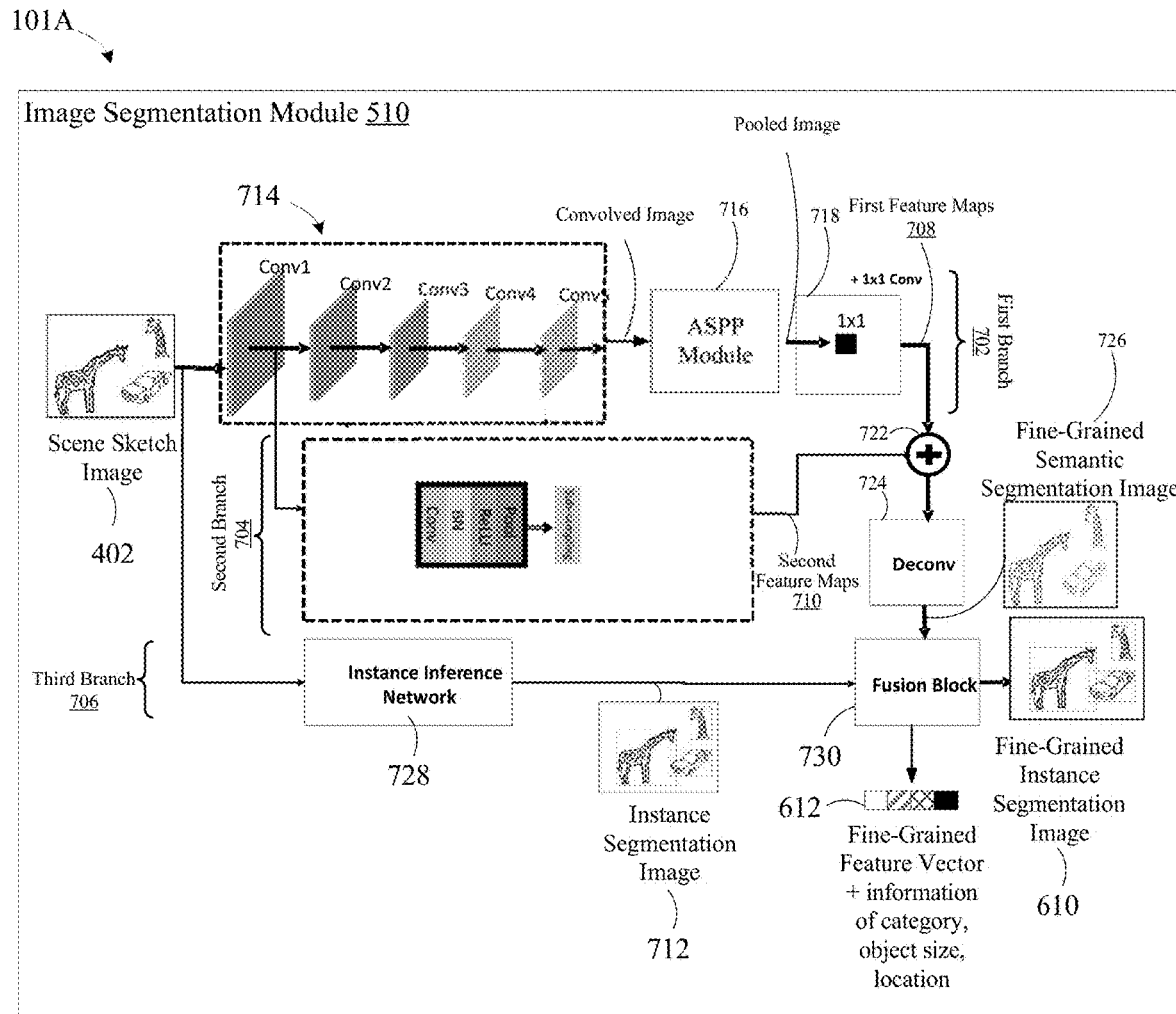
FIG. 7A is a flow diagram of a scene sketch image segmentation method, for use in the image retrieval method, in accordance with an example embodiment.

Referring to FIG. 7A, a scene sketch image segmentation method performed by the image segmentation module 510 in accordance with an example embodiment will be described. The image segmentation module 510 generates, from the scene sketch image 402, the fine-grained instance segmentation image 610, the fine-grained feature vector 612, and category information, object size information, and location information for each detected object instance. An example of scene sketch image segmentation on the scene sketch image 402 will be described in greater detail, with the understanding that the scene sketch image segmentation can also be performed on all of the scene images in the image collection 406 to generate, for those scene images, a respective fine-grained instance segmentation image 632, a respective fine-grained feature vector 634, and category information, object size information, and location information for each detected object instance.

The image segmentation module 510 includes branches of a convolutional neural network, denoted first branch 702, second branch 704, and third branch 706. The second branch 704 is partly in parallel to the first branch 702, and is connected to the output of a first convolution layer Conv1 of the convolution block 714 of the first branch 702 convolutional neural network. The third branch 706 is parallel to the first branch 702 and the second branch 704.

The image segmentation module 510 classifies each pixel of the scene sketch image and outputs a fine-grained instance segmentation image 610 (i.e., object instances and their per-pixel semantic segmentation).

The first branch 702 is configured to generate first feature maps 708 from the scene sketch image 402. The first branch 702 segments the scene sketch image 402 by object category (semantics), in which the number of channels of the first feature maps 708 is equal to the number of object categories (number of semantics). The second branch 704 is configured to generate second feature maps 710 which include fine-grain details of the object categories extracted from the scene sketch image 402. The fine-grain details can include visual attributes of the object categories. The number of channels of the second feature maps 710 is equal to the number of object categories (number of semantics). The third branch 706 is configured to generate an instance segmentation image 712 that segments each object instance detected from the scene sketch image 402.

The first branch 702 includes a convolution block 714, an Atrous Spatial Pyramid Pooling (ASPP) module 716, and a 1×1 convolution module 718. The convolution block 714 includes convolution layers, in series, Conv1, Conv2, Conv3, Conv4, Conv5. The output from the last convolution layer Conv5 is a convolved scene image. In the convolution block 714, the first convolutional layer Conv 1 extracts a relatively large quantity of common features. The common feature may also be referred to as a low-level feature. As a depth (number of convolutional layers) of the convolution block 714 increases, a feature extracted by a deeper convolutional layer (such as Conv2, Conv3, or high layers) becomes more complex, for example, a feature with high-level semantics or the like. A feature with higher-level semantics is more applicable to a to-be-resolved problem.

The ASPP module 716 generates, from the convolved scene image, a pooled scene image. The convolution module 718 performs 1×1 convolution on the pooled scene image and outputs the first feature maps 708 of the scene sketch image 402.

For the first branch 702, the sketch scene image 402 is fed into the convolution block 714. For example, the convolution block 714 can be a network modified from ResNet-101 (Kaiming He et al.: Deep residual learning for image recognition. CVPR, pages 770-778, 2016, incorporated herein by reference) to extract low-level features. This convolution block 714 has the same structure with ResNet-101 on the Conv1, Conv2, and Conv3 blocks. The convolutions in the two higher-level residual blocks, Conv4 and Conv5, are converted to atrous convolutions with sampling rate 2 and 4, respectively. The resolutions of feature maps remain unchanged from block conv3 to the end of this branch, which is ⅛ of the scene sketch image 402.

The second branch 704 can be denoted a fine-grained feature branch that generates the second feature maps 710. The second feature maps 710 include fine-grained features that provide more detail of the object categories than the first branch 702. The second branch 704 is performed by a CNN block 706 which includes, in series, a convolution layer, a BN layer, a ReLU layer, a Pooling layer, and a Sub-sampling layer. The output of the sub-sampling layer is the second feature maps 710 of the scene sketch image 402.

The second branch 704 can be denoted a Fine-Grained (FG) branch. The second branch 704 is a shortcut that connects from one of the low convolution layers, e.g., Conv1 to the first feature maps 708. The second branch 704 is configured to transfer high-resolution fine-grained features of lines, corners, and contours to compensate lost details that may not be contained in the first feature maps 708 of the first branch 702. In an example, the second branch 704 includes a CNN block 706 which includes, in series: a 3×3 convolution with stride 2, a batch normalization (BN) operation performed by the BN layer, a nonlinearity and activation function operation performed by the ReLU layer, and a 3×3 max-pooling operation performed by the pooling layer with stride 2. The output of the CNN block 706 is ¼ of the input image. To match size and dimension, the sub-sampling layer is used to down-sample the high-resolution feature maps to ⅛. The number of channels of the second feature maps 710 is also reduced to the number of output categories.

In the scene sketch image segmentation method of FIG. 7A, an addition module 722 performs element-wise addition on the first feature maps and the second feature maps 710 to generate combined feature maps. A deconvolution module 724 deconvolves the combined feature maps to generate a fine-grained semantic segmentation image 726, which matches the dimension of the fine-grained semantic segmentation image 726 to the scene sketch image 402. The deconvolution module 724 is used to up-sample the combined feature maps to the same size as the input scene sketch image. In some examples, the fine-grained semantic segmentation image 726 segments the detected objects by object category (object semantics), and not by object instance at this stage.

The third branch 706 includes an instance inference network 728 that generates the instance segmentation image 712 of each detected object instance from the scene sketch image 402. In an example, the instance inference network 728 can include an instance segmentation neural network such as Mask-RCNN (Kaiming He et al.: Mask R-CNN, IEEE Trans. Pattern Anal. Mach. Intell. 42(2): 386-397 (2020), incorporated herein by reference) on the query scene sketch image. In other examples, the instance segmentation image 712 can be generated by the third branch 706 using a heuristic rule based algorithm (e.g., presuming all the connected drawing points belong the same object instance) from the query scene sketch image 402. In another example, the instance segmentation image 712 can be generated via user interaction, e.g., receiving scribbling input or otherwise receiving user input which identifies each particular object instance.

A fusion block module 730 fuses the instance segmentation image 712 with the fine-grained semantic segmentation image 726 to generate the fine-grained instance segmentation image 610, a respective fine-grained feature vector 612 for each object instance, and category information, object size information, and location information for each detected object instance. The fine-grained instance segmentation image 610 includes object categories detected by the first branch 702, fine-grained details from the second branch 704, and segmented objected instances detected by the third branch 706. Therefore, the fine-grained instance segmentation image 610 includes the fusing of high-level pyramid features from the first branch 702 with rich semantic information from the first branch 702 and fine-grained features with rich details from the second branch 704. In the fine-grained instance segmentation image 610, each object instance is represented by a different color.

The FG branch (second branch 704) can directly obtain fine-grained local features without significantly increasing parameters and computations. By minimizing the amount of parameters, the FG branch also acts as a regularization term. In some examples, the FG branch is approximated as a network-level residual block that forces the image segmentation module 510 to learn residuals.

Figure 7B:
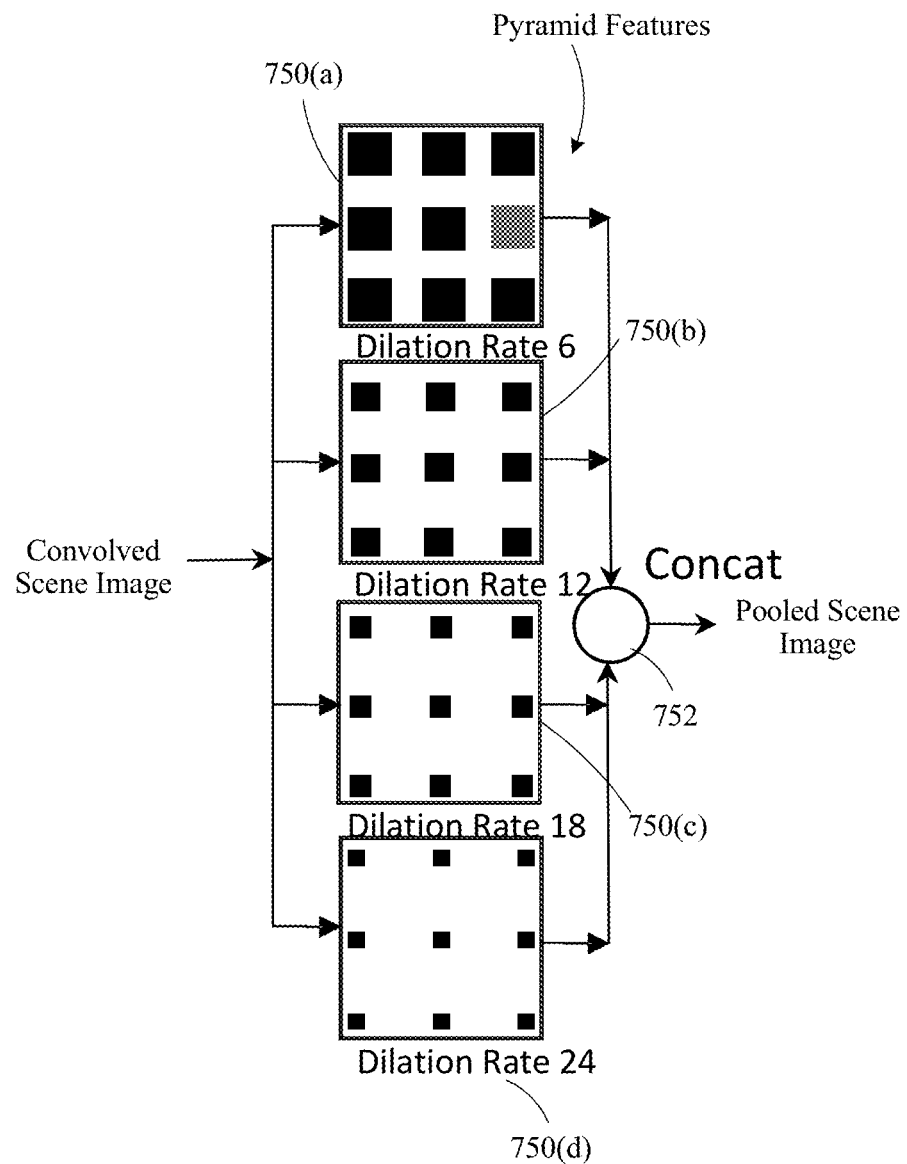
FIG. 7B is a flow diagram executed by an Atrous Spatial Pyramid Pooling (ASPP) module of FIG. 7A.

FIG. 7B is a flow diagram of the Atrous Spatial Pyramid Pooling (ASPP) method executed by the ASPP module 716. The ASPP module 716 receives the convolved scene image and generates a pooled scene image. The ASPP module 716 is used to perceive objects at multiple scales. The ASPP module 716 includes four 3×3 atrous convolution modules 750(a), 750(b), 750(c), 750(d) (each or individually 750) in parallel. The operation of the atrous convolution modules 750 are described in Liang-Chieh Chen et al., DeepLab: Semantic Image Segmentation with Deep Convolutional Nets, Atrous Convolution, and Fully Connected CRFs, arXiv preprint, 2016, incorporated herein by reference. The four 3×3 atrous convolution modules 750 have different dilated sampling rates (e.g., 6, 12, 18, and 24, respectively, as shown), also called dilation rates. The output from the four 3×3 atrous convolution modules 750 is respective pyramid features, in which the pyramid features are ⅛ size of the original input of the scene sketch image 402. The number of channels of the pyramid features are set to the number of object categories. In this way, each channel can be regarded as a heat map or probe to be responsible for each object category. These pyramid features, with different scale context information, are concatenated together using the concatenation module 752 and the pooled scene image is generated by the ASPP module 716.

In some alternate examples, referring again to FIG. 7A, the input to the ASPP module 716 is a convolved scene image from one of the residual blocks of one of the convolution layers Conv1, Conv2, Conv3, Conv4 (or their alternatives) of the convolution block 714.

Figure 8A:
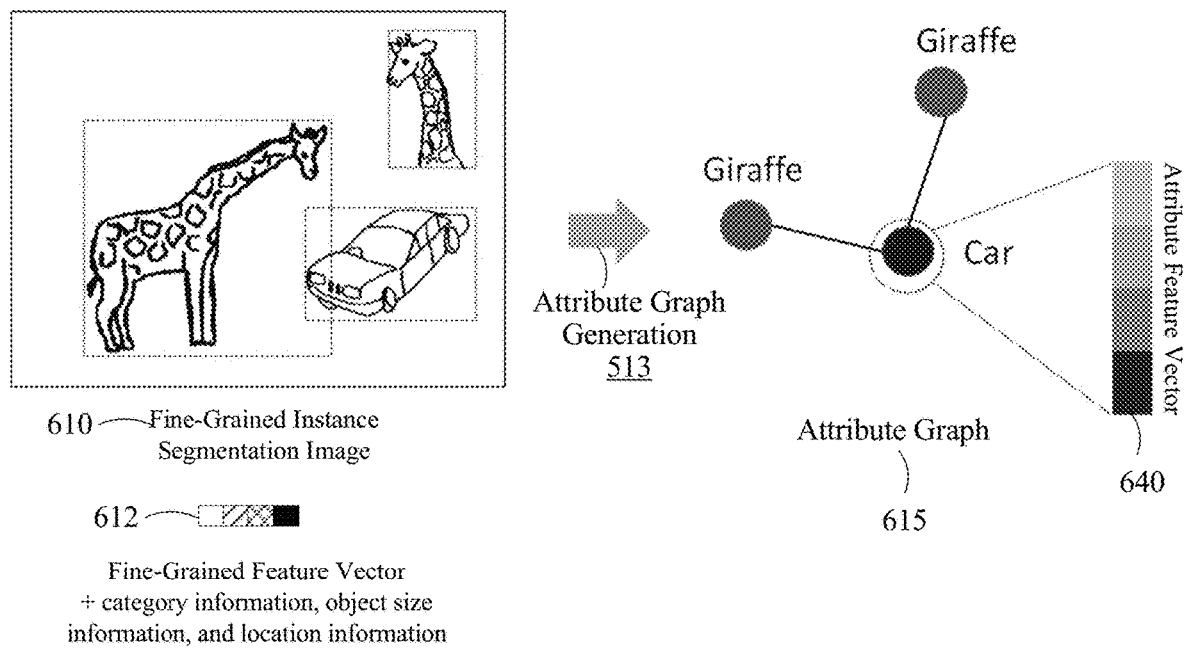
FIG. 8A illustrates a pictorial diagram of an attribute graph generation method, for use in the image retrieval method, in accordance with an example embodiment.

FIG. 8A illustrates a pictorial diagram of an attribute graph generation method performed by the attribute graph generation module 513. The attribute graph 615 is generated from the fine-grained instance segmentation image 610, the fine-grained feature vector 612, and category information, object size information, and location information for each detected object instance (from FIG. 7A).

The fine-grained instance segmentation image 610, the fine-grained feature vector 612, and category information, object size information, and location information for each detected object instance are received from the image segmentation module 510 (FIG. 7A). As described above in relation to FIG. 5B, a respective attribute graph 516 can also be generated for each or every scene image 502 in the image collection 406 (not shown here).

As shown in FIG. 8A, the fine-grained instance segmentation image 610, which is generated from the target scene image 404 in this example, includes the object instances: first giraffe, second giraffe, and car. The attribute graph 615 includes nodes that represent the first giraffe, the second giraffe, and the car. Each node also includes a respective attribute feature vector 640 which includes the attributes of the respective object instance. For example, the node for the car includes an attribute feature vector 640, generated from the fine-grained feature vector 612, and category information, object size information, and location information for each detected object instance. The fine-grained feature vector 612 includes attributes of the car, such as visual attributes. The attribute feature vector 640 can include one or more of the following attributes of the car: i) the object category; ii) the size and location of the object instance (alternatively a bounding box represented by a rectangle on the image); iii) visual attributes such as appearance, texture, shape, and pose; and iv) other information.

The attribute graph 615 also includes edges between the nodes, which are weights. In an example, the weights represent the Euclidean distance between the nodes. In example embodiments of the image retrieval method performed by the image retrieval system 400, the attribute graph 615 can be compared to find the most similar image in the image collection 406 to the scene sketch image 402.

The object category can be generated by using Word2Vec by Google™ (https://code.google.com/archive/p/word2vec/, incorporated herein by reference) or One-Hot encoding algorithm (see https://en.wikipedia.org/wiki/One-hot, incorporated herein by reference). The size and location of the object instance can be normalized in some examples. The visual features can be generated from Inception-V3 network (Szegedy, C. et al.: Rethinking the inception architecture for computer vision, Proceedings of the IEEE conference on computer vision and pattern recognition, 11 Dec. 2005, incorporated herein by reference), its alternatives. The fine-grained feature vectors 612 includes different visual attributes which are concatenated together and form the respective fine-grained feature vector 612 for each of the object instances.

There are several different example methods for the attribute graph generation module 513 to generate the edges connecting the nodes. One example method is for the attribute graph generation module 513 to generate a weighted undirected edge for any two nodes. The attribute graph 615 therefore can be defined with an edge set E and a graph G. The edge weight for each edge e(i,j) connecting a pair of nodes, (n_i, n_j), can be the normalized Euclidean distance of (n_i, n_j). Define the Euclidean distance of the two features of the nodes n_i and n_j as Dis (n_i, n_j), the normalized Euclidean distance between (n_i, n_j) is Dis (n_i, n_j)/Σ Dis (.), where Σ Dis (.) denotes the sum of the Euclidean distances of all the node pairs connected with edge. There are some alternative ways to generate the edges from the nodes.

Referring again to FIG. 5B, the graph encoder module 515 generates the feature graph 518 from the attribute graph 615 (shown as attribute graph 516 in FIG. 5B).

In some examples, after the attribute graph 615 is generated, the graph encoder module 515 uses a graph convolutional network (GCN) to learn node-level representations for the attribute graph 615 by updating the node features by propagating information between nodes. The GCN learns a function f(.) to extract features on a graph G=(N;E), which takes as inputs the attribute feature vector for each object instance in the scene sketch image 402 and a corresponding attribute feature vector for the same object instance in the scene image 404 in the image collection 406. The outputs of a last layer of the GCN for the scene sketch image 402 and the image 404 are the encoded feature graph 518, respectively denoted feature graph G_S and feature graph G_I.

Referring to FIG. 6A, the graph matching module 618 generates a graph similarity 620 between the feature graph G_S and feature graph G_I. After generating the encoded feature graphs G_S and G_I for the scene sketch image 402 and the image 404, the graph matching module 618 can use the following graph matching algorithm to measure the similarity of the two feature graphs G_S and G_I. For example, the graph matching algorithm can transfer the similarity of two feature graphs to the similarity between all feature node pairs in G_S and G_I. Specifically, for each feature node n_i in G_S, the graph matching algorithm finds the most similar node in G_I and compute the similarity score S_{n_i} for the feature node n_i (cosine distance is used to compute the similarity between the features of two nodes). The overall similarity between G_S and G_I can be computed by summing up all the similarity score of the feature nodes in G_S. The sum of the similarity score is output as the graph similarity 620.

Figure 8B:
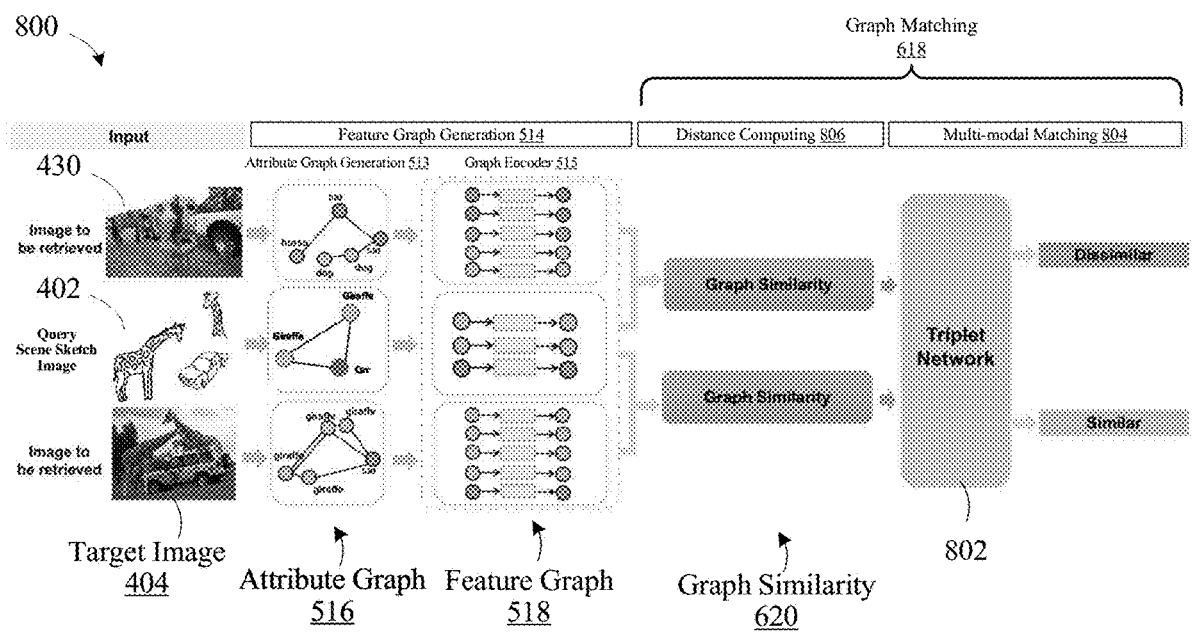
FIG. 8B illustrates a detail flow diagram of a graph encoder module training method for training of a graph neural network (GNN) of a graph encoder of FIG. 5A, in accordance with an example embodiment.

FIG. 8B illustrates a graph encoder training method 800 for training of a GNN of the graph encoder 515, in accordance with an example embodiment. The graph encoder module 515 is configured to execute the graph encoder model 101B (FIG. 1). The graph encoder training method 800 includes a triplet network 802, which is used to train the graph encoder module 515 using three inputs. The inputs to the graph encoder training method 800 are scene images, which can include the scene sketch image 402, the target image 404, and another image 430 in the image collection 406 that is known to be dissimilar to the scene sketch image 402.

To achieve optimal parameters for the GNN of the graph encoder module 515, a triplet training process is used by the graph encoder training method 800. A triple loss of the triplet training process is used to enforce that the embedding features of two images with the same label are close and the embedding features of two examples images with different labels are far away. A triplet (S, I⁺, I⁻) is given where S is the query scene sketch image 402, I⁺ is the target image 404 that can be depicted the scene sketch image 402, I⁻ is the image 430 that the query sketch S cannot depict (i.e., from a different scene). The triple training process is to optimize the following loss function:

$$L_{tri} = \max(d(S,I^+) - d(S,I^-) + m, 0) \quad (2)$$

where d(.) is the distance function described above in the graph matching module 618 and m is a margin which is set to a constant.

In FIG. 8B, the image segmentation module 510 (not shown here) generates, for each input scene image, a fine-grained instance segmentation image 511, a fine-grained feature vector 512, and category information, object size information, and location information for each detected object instance. The attribute graph generation module 513 generates an attribute graph 516 for each scene image from the fine-grained instance segmentation image 511, the fine-grained feature vector 512, and category information, object size information, and location information for each detected object instance. The graph encoder module 515 also generates a feature graph 518 for each scene image.

The graph matching module 618 generates a graph similarity 620 for a pair of feature graphs 518. In the present example, the graph matching module 618 generates a first graph similarity 620 between the sketch scene image 402 and the target image 404. The graph matching module 618 generates a second graph similarity 620 between the sketch scene image 402 and the other scene image 430. In an example, the graph matching module 618 uses a distance computing module 806 to generate the graph similarity 620. The graph matching module 620 also includes a multi-modal matching module 804, which includes the triplet network 802. The triplet network 802 generates, from each graph similarity 620, a conclusion of whether two feature graphs 518 are similar or dissimilar. In the present example, the target image 404 is used to generate an output of being similar to the sketch scene image 402, and the other image 430 results in an output of being dissimilar to the sketch scene image 402. In an example, the output is a graph similarity value.

FIG. 9A illustrates an attribute graph 516(a), which is an example of the attribute graph 516 generated by the attribute graph generation module 513, in accordance with an example embodiment. The attribute graph 516(a) includes nodes v1, v2, . . . , v6 (generically vn). Each node vn represents a detected object instance from the scene image 502. Each node vn includes an attribute feature vector that represents attributes of the respective object instance. The attribute graph 516(a) includes edges e1, e2, . . . , e6 (generically en). Each edge en connects two of the nodes vn. Each edge includes a weight between one of the nodes vn to one of the other nodes. The weight can be a Euclidean distance in some examples. The graph matching module 618 (FIG. 6A) can generate a graph similarity between the attribute graph 516(a) of the scene sketch input 402 and the attribute graph 516(a) of one of the images in the image collection 406.

FIG. 9B illustrates a hypergraph 516(b), which is another example of the attribute graph 516 generated by the attribute graph generation module 513, in accordance with an example embodiment. The hypergraph 516(b) includes nodes v1, v2, . . . , v6 (generically vn). Each node vn represents a detected object instance from the scene image 502. Each node vn includes an attribute feature vector that represents attributes of the respective object instance. The hypergraph 516(b) includes edges e1, e2, e3 (generically en). Each edge en connects one of the nodes vn to at least one of the other nodes vn. For example, an edge can be defined from one node vn to a plurality of other nodes vn. For example, edge e1 connects node v1 to other nodes v2, v3 and v5. Each edge en includes a weight between one of the nodes vn to at least one of the other nodes. The graph matching module 618 (FIG. 6A) can generate a graph similarity between the hypergraph 516(b) of the scene sketch input 402 and the hypergraph 516(b) of one of the images in the image collection 406.

Referring to the hypergraph 516(b), the feature graph generation module 514 can be configured to perform a hypergraph generation algorithm. As opposed to the attribute graph 516(a) where two vertices are joined together by an edge, each hyper-edge in the hypergraph 516(b) can connect any number of vertices as illustrated in FIG. 9B. The hypergraph 516(b) has significant advantages in formulating complicated correlation among data. Accordingly, the graph matching module 618 in FIG. 6A can be configured to perform a hypergraph matching algorithm.

The user of the hypergraph 516(b) can improve the overall image retrieval accuracy and recall, offset by potential increase in computational cost and response time of each image query.

Figure 10A:
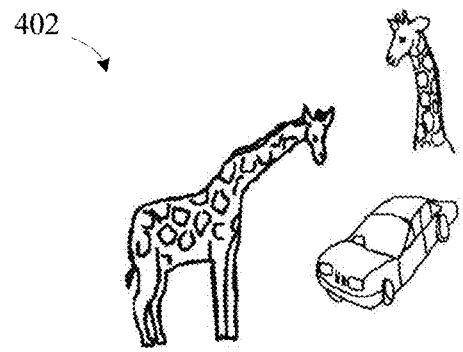
FIGS. 10A, 10B and 10C illustrate images of another example graph matching method, for use in the image retrieval method of FIG. 4, in accordance with another example embodiment.
Figure 10B:
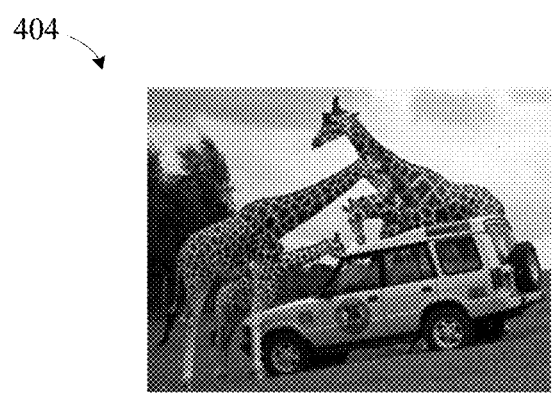
Figure 10C:
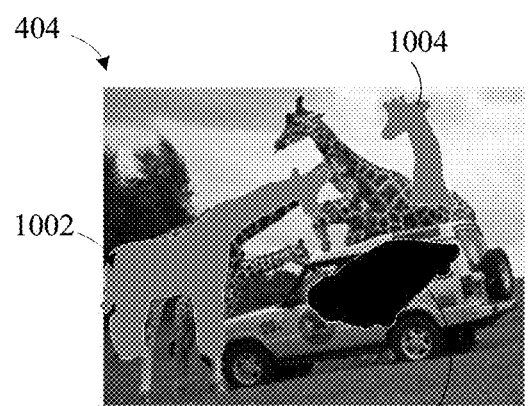

FIGS. 10A, 10B and 10C illustrate another example graph matching method performed by the graph matching module 618, for use in the image retrieval method 300, in accordance with another example embodiment. FIG. 10A shows the scene sketch image 402 that is input to the image retrieval system 400. FIG. 10C illustrates an image generated by the example graph matching method. In an example, the image retrieval method 300 performed by the image retrieval system 400 generates a mask image of the object categories detected from the scene sketch image. For example, FIG. 10B show the target scene image 404. FIG. 10C shows the mask image of the scene sketch image 402 overlaid on the target scene image 404. In FIG. 10C, the mask of the first giraffe 1002 and the mask of the second giraffe 1004 in the scene sketch image 402 are a first color and the mask of the car 1006 in the scene sketch image 402 is a second color. In FIG. 10C, the mask of the first giraffe 1002 and the mask of the second giraffe 1004 in the scene sketch image 402 are grey color and the mask of the car 1006 in the scene sketch image 402 is black color.

The distance between the scene sketch S and I in above embodiments is based on the distance metric as well as additional similarity criteria. Therefore, an example embodiment of the distance metric fuses other similarity into the distance metric, such as union of object masks. For example, the distance is formulated as:

$$d(S,I)=1-\lambda_1\phi_{GM}(S,I)-\lambda_2\phi_{IoU}(S,I) \qquad (3)$$

where $\phi_{GM}$ denotes the graph similarity 620, i.e., the similarity of the generated attribute graphs of I and S, and $\phi_{IoU}$ denotes other metric based similarity such as the Category-Wise Intersection over Union (IoU) score (i.e., the similarity of the layout and sizes of object instances from S and I). The Category-Wise IoU score is computed the intersection and the union of object masks that belongs to the same categories in I and S (i.e., the Category-Wise IoU score measures how much the masks of objects in S overlap the masks of the objects belonging to the same category in I). The Category-Wise IoU score can be defined as the division of the sum of the intersection masks of all object categories and the sum of the union masks of all object categories as illustrated in FIG. 10C.

Additional and alternate example embodiments of the image retrieval method 300 will now be described.

In another example, referring to FIGS. 10A, 10B, and 10C, rather than Category-Wise IoU, the method 300 uses Instance-Wise IoU. The mask in FIG. 10C differs in that a different color mask is generated for each object instance. The Instance-Wise IoU score can be defined as the division of the sum of the intersection masks of all object instances and the sum of the union masks of all object instances.

Referring again to FIG. 6A, an alternate example of the image retrieval method performed by the image retrieval system 400 will now be described. As describe above, the feature graph 616 is based on the fine-grained feature vector 612, and category information, object size information, and location information for each detected object instance, and then a GCN is used to extract features from the feature graph 616. In this way, multiple attribute information is fused into the attribute feature vector in an early stage, for example by the attribute graph generation module 513 (FIG. 5B). In an alternate example embodiment, the multiple attribute information can be fused in a later stage of the image retrieval system 400. In an example, GCN (or alternatives) can extract the attribute-specific features from single-attribute based graphs. A scene sketch image S can be represented by n attribute-specific graphs ($G\_S^{A1}$, $G\_S^{A2}$, ..., $G\_S^{Aj}$, ..., $G\_S^{An}$) (n is the number of the attribute types, Aj denotes a specific attribute). Similarly, a scene image I retrieved from the image collection 406 can also be represented by n attribute-specific graphs ($G\_I^{A1}$, $G\_I^{A2}$, ..., $G\_I^{Aj}$, ..., $G\_I^{An}$). The distance between the scene sketch image S and image I is the weighted distance of n pairs of graphs. That overall distance between G_S and G_I can be computed by $$W1*DIS(G\_S^{A1}, G\_I^{A1}) \ldots +Wj*DIS(G\_S^{Aj}, G\_I^{Aj}) \ldots +Wn*(G\_S^{An}, G\_I^{An}) \quad (4)$$

DIS(.) is the distance function computing the distance between two graphs, as described above in equation (3). The n weights for each pair of graphs, W1, W2 ..., Wj ..., and Wn, can be learnt by triplet training process or set to constant values empirically.

Referring to FIG. 7A, an alternate example of the image segmentation module 510 will now be described. For example, the first branch 702 can be replaced by CNNs such as GoogleNet (Szegedy, C. et al., supra), or VGGNet (Karen Simonyan et al.: Very Deep Convolutional Networks for Large-Scale Image Recognition, conference paper at ICLR 2015, 10 Apr. 2015, incorporated herein by reference).

Referring to FIG. 7A, in another example of the image segmentation module 510, the second branch 704 is optional which reduces processing, balanced against a potential drop in accuracy.

It would also be appreciated that the image retrieval method 300 can be used to retrieve a target video frame (or an entire video containing the target video frame) from a video dataset or the image collection 406.

In some examples, it may be appreciated that alternate types of encoding may be performed by the graph encoder module 515 on the attribute graphs 516. Since the scene image 502 is represented by an attribute graph 516, the graph similarity or distance can be transferred to the node similarity or distance. Therefore, different weight can be assigned to the nodes, which further provides additional parameters to improve accuracy of the image retrieval method 300. The image retrieval method 300 can be modified to various retrieval tasks by adjusting the weight of a specific attribute. For example, by assigning large weight to small objects, the image retrieval method 300 can achieve an effective retrieval of the target images 404 containing small-size objects.

It should be understood by a person skilled in the art that, for the purpose of convenient and brief description, for a detailed working process of the foregoing system, apparatus, and unit, refer to a corresponding process in the foregoing method embodiments, and details are not described herein again.

In the several embodiments described, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions may be implemented in a form of a software product. The software product is stored in a storage medium, and includes several instructions for instructing a computer device (which may be a personal computer, a server, or a network device) to perform all or some of the steps of the methods described in the example embodiments. The foregoing storage medium includes any medium that can store program code, such as a Universal Serial Bus (USB) flash drive, a removable hard disk, a read-only memory (Read-Only Memory, ROM), a random access memory (Random Access Memory, RAM), a magnetic disk, or an optical disc.

The foregoing descriptions are merely specific implementations, but are not intended to limit the scope of protection. Any variation or replacement readily figured out by a person skilled in the art within the technical scope shall fall within the scope of protection. Therefore, the scope of protection shall be subject to the protection scope of the claims.

What is claimed is:

1. An image retrieval method, comprising:
receiving a scene sketch image;
generating, using a sketch segmentation model, a fine-grained instance segmentation image comprising at least one object instance detected in the scene sketch image, a fine-grained feature vector encoding one or more visual attributes for each of the at least one detected object instance, and category information, object size information, and location information for the at least one detected object instance;
generating a feature graph for the fine-grained instance segmentation image comprising nodes and edges, each node in the feature graph corresponding to one of the at least one object instances in the fine-grained instance segmentation image and an attribute feature vector of the corresponding object instance representing one or more attributes for each of the at least one detected object instance, each edge defining a weight between one of the nodes and at least one of the other nodes;
generating a respective graph similarity between the feature graph for the fine-grained instance segmentation image and a feature graph for each respective image in an image collection; and outputting identification of at least one image in the image collection having highest graph similarity to the scene sketch image.

2. The image retrieval method as claimed in claim 1:
wherein attributes of each attribute feature vector include, for each object instance: i) category label, and ii) size and location identification.

3. The image retrieval method as claimed in claim 1 wherein the one or more attributes of each attribute vector further includes, for each object instance: iii) one or more visual attributes.

4. The image retrieval method as claimed in claim 3 wherein the one or more visual attributes for each object instance includes at least one of: appearance, texture, shape, or pose.

5. The image retrieval method as claimed in claim 1, wherein each edge is undirected.

6. The image retrieval method as claimed in claim 1, wherein each weight represents Euclidean distance in the feature graph.

7. The image retrieval method as claimed in claim 1:
wherein generating the feature graph includes generating an attribute graph for the fine-grained instance segmentation image and encoding the attribute graph to generate the feature graph.

8. The image retrieval method as claimed in claim 1, further comprising generating the feature graph for each respective image in the image collection.

9. The image retrieval method as claimed in claim 8, wherein the generating the feature graph for each respective image in the image collection is pre-processed; further comprising storing the feature graph for each respective image in the image collection to memory.

10. The image retrieval method as claimed in claim 8, wherein the generating the feature graph for each respective image in the image collection includes pre-processing each image in the image collection using an image segmentation model to generate a respective fine-grained instance segmentation image, a respective fine-grained feature vector, and category information, object size information, and location information for the at least one detected object instance, and storing the respective fine-grained instance segmentation image, the respective fine-grained feature vector, and the category information, object size information, and location information for the at least one detected object instance of each image in the image collection to memory.

11. The image retrieval method as claimed in claim 8, wherein the generating the feature graph for each respective image in the image collection is in response to the receiving the scene sketch image, and includes generating a respective fine-grained instance segmentation image, a respective fine-grained feature vector, and category information, object size information, and location information for the at least one detected object instance.

12. The image retrieval method as claimed in claim 1, wherein the generating the respective graph similarity includes computing a distance between at least one node of the feature graph for the fine-grained instance segmentation image and at least one node of the feature graph for at least one respective image in the image collection.

13. The image retrieval method as claimed in claim 1, wherein the generating the respective graph similarity includes generating a category mask of the scene sketch image and a category mask of each respective image in the image collection, and computing an intersection of the category mask of the scene sketch image and the category mask each respective image in the image collection.

14. The image retrieval method as claimed in claim 13, wherein the generating the respective graph similarity includes dividing the intersection by a union of the category mask of the scene sketch image and the category mask each respective image in the image collection.

15. The image retrieval method as claimed in claim 1, wherein the segmenting the scene sketch image includes:
generating, using a first convolution neural network on the scene sketch image, first features maps of at least one object category of the scene sketch image;
generating, using a second convolution neural network on the scene sketch image, second feature maps of fine-grained details of the at least one object category;
generating, using a third convolution neural network on the scene sketch image, an instance segmentation image which identifies the at least one object instance of the scene sketch image; and
wherein the generating of the fine-grained instance segmentation image, the fine-grained feature vector encoding, and the category information, object size information, and location information, is generated from the first feature maps, the second feature maps, and the instance segmentation image.

16. The image retrieval method as claimed in claim 1, wherein at least one edge defines a weight between a respective one of the nodes and a plurality of the other nodes.

17. The image retrieval method as claimed in claim 16, wherein the feature graph is a hypergraph.

18. An image segmentation method, comprising:
receiving a scene image;
generating, using a first convolution neural network on the scene image, first features maps of at least one object category of the scene image;
generating, using a second convolution neural network on the scene image, second feature maps of fine-grained details of the at least one object category;
generating, using a third convolution neural network on the scene image, an instance segmentation image which identifies at least one object instance of the scene image; and
generating, using the first feature maps, the second feature maps, and the instance segmentation image, a fine-grained instance segmentation image comprising the at least one detected object instance, a fine-grained feature vector encoding one or more visual attributes for each of the at least one detected object instance, and category information, object size information, and location information for the at least one detected object instance.

19. The image segmentation method as claimed in claim 18, further comprising:
generating, using a first convolution neural network layer on the image, a convolved scene image, wherein the convolved scene image is used by the second convolution neural network.

20. The image segmentation method as claimed in claim 18:
further comprising generating, from the first feature maps, the second feature maps, and the instance segmentation image, for each object instance: i) category label, and ii) size and location identification.

21. The image segmentation method as claimed in claim 18 wherein the respective one or more attributes further includes, for each object instance: one or more visual attributes.

22. The image segmentation method as claimed in claim 21 wherein the one or more visual attributes for each object instance includes at least one of: appearance, texture, shape, or pose.

23. The image segmentation method as claimed in claim 18, wherein the first convolution neural network includes a convolution block for generating a convolved scene image from the scene image and an Atrous Spatial Pyramid Pooling (ASPP) module for generating a pooled image from the convolved scene image.

24. The image segmentation method as claimed in claim 23, wherein the ASPP module includes a plurality of atrous convolution modules, each atrous convolution module having a different sampling rate and which output pyramid features, and a concatenation module for generating the pooled image from concatenating the pyramid features.

25. The image segmentation method as claimed in claim 18, wherein at least part of the first neural network is parallel to the second neural network and the third neural network.

* * * * *